United States Patent [19]

Lyle et al.

[11] Patent Number: 4,949,656
[45] Date of Patent: Aug. 21, 1990

[54] DISTRIBUTION MANIFOLD FOR MOBILE SPAN-AND-TOWER IRRIGATION SYSTEMS

[75] Inventors: William M. Lyle, Ralls; James P. Bordovsky, Plainview, both of Tex.; Mark A. Butler, Hastings, Nebr.

[73] Assignee: The Texas A&M University System, College Station, Tex.

[21] Appl. No.: 437,375

[22] Filed: Nov. 15, 1989

Related U.S. Application Data

[62] Division of Ser. No. 150,776, Feb. 1, 1988.

[51] Int. Cl.[5] ................................................. A01C 7/18
[52] U.S. Cl. .................................... 111/174; 111/900; 239/727
[58] Field of Search ..................... 111/34, 174, 900; 239/727, 734

[56] References Cited

U.S. PATENT DOCUMENTS

| | | | |
|---|---|---|---|
| 4,277,026 | 7/1981 | Garvey | 239/727 X |
| 4,397,421 | 8/1983 | Sibram | 239/727 |
| 4,729,514 | 3/1988 | Ostrom et al. | 111/174 X |
| 4,763,836 | 8/1988 | Lyle | 239/727 X |

Primary Examiner—John C. Fox
Attorney, Agent, or Firm—Arnold, White & Durkee

[57] ABSTRACT

A field planting system for use in conjunction with large span and wheel tower irrigation apparatus to place seed in a field across a number of rows simultaneously. Seed is suspended uniformly in a gel solution and injected into a stream of carrier water. The seeds, suspended in water, travel in piping separate from irrigation piping to a manifold suspended from the overhead span section. Each manifold distributes seed and carrier water to a plurality of drop tubes. A tube valve located in each drop tube is closed to permit the manifold to be charged with seeds and water under pressure. Once the manifold is charged, the tube valves open simultaneously and the water and seed discharges from the manifold through drop tubes to a planting shoe. The planting shoe includes a forward nozzle to emit a high pressure stream of water to excavate a small trench or furrow into which the seed is dispensed. A perforated metal tube angling rearwardly from the drop tube dissipates the energy of the carrier water to assure that the seed is not washed from the trench. A trench closer trails the planting shoe to push some of the dislodged soil over the seed and cover the furrow.

4 Claims, 20 Drawing Sheets

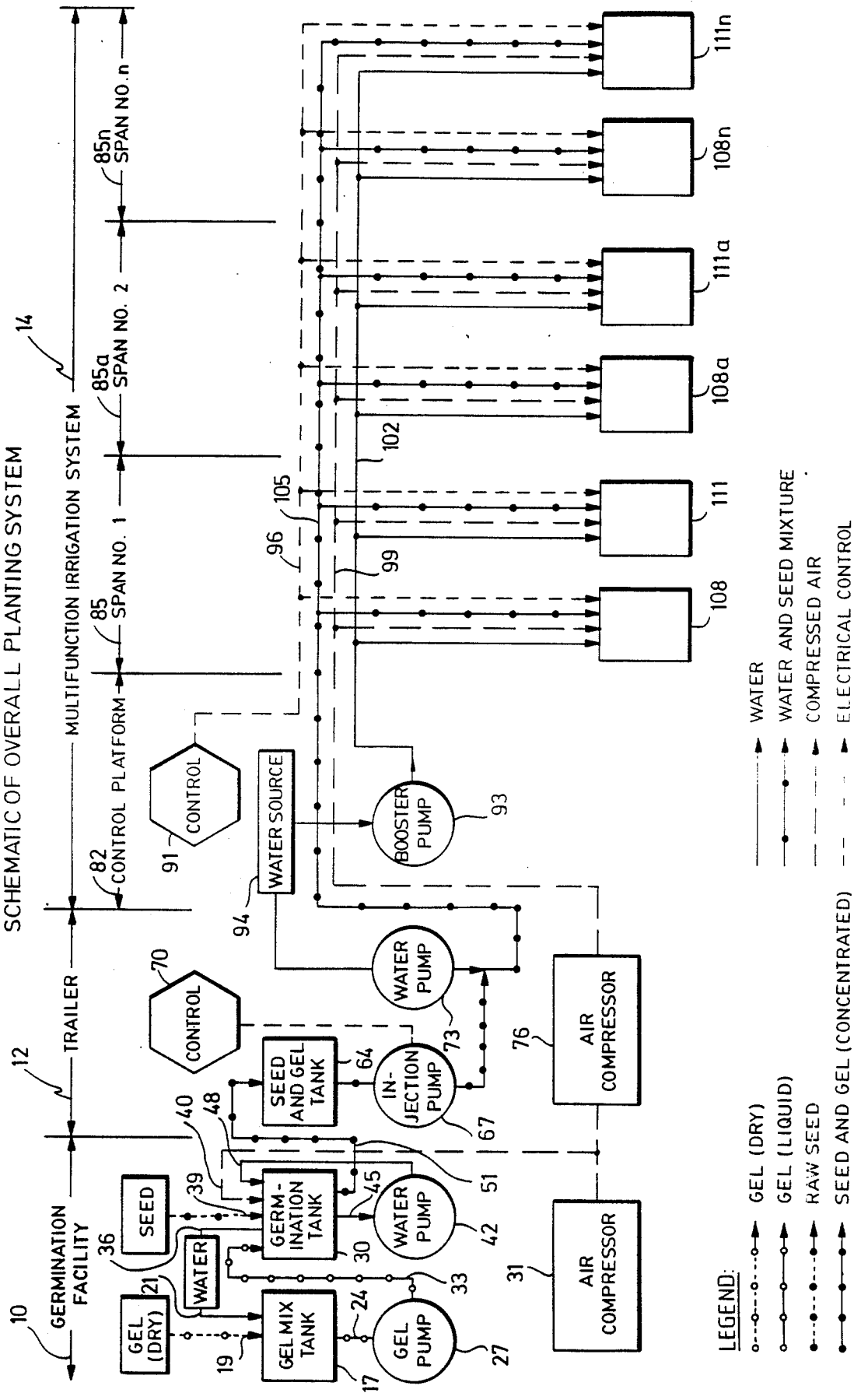

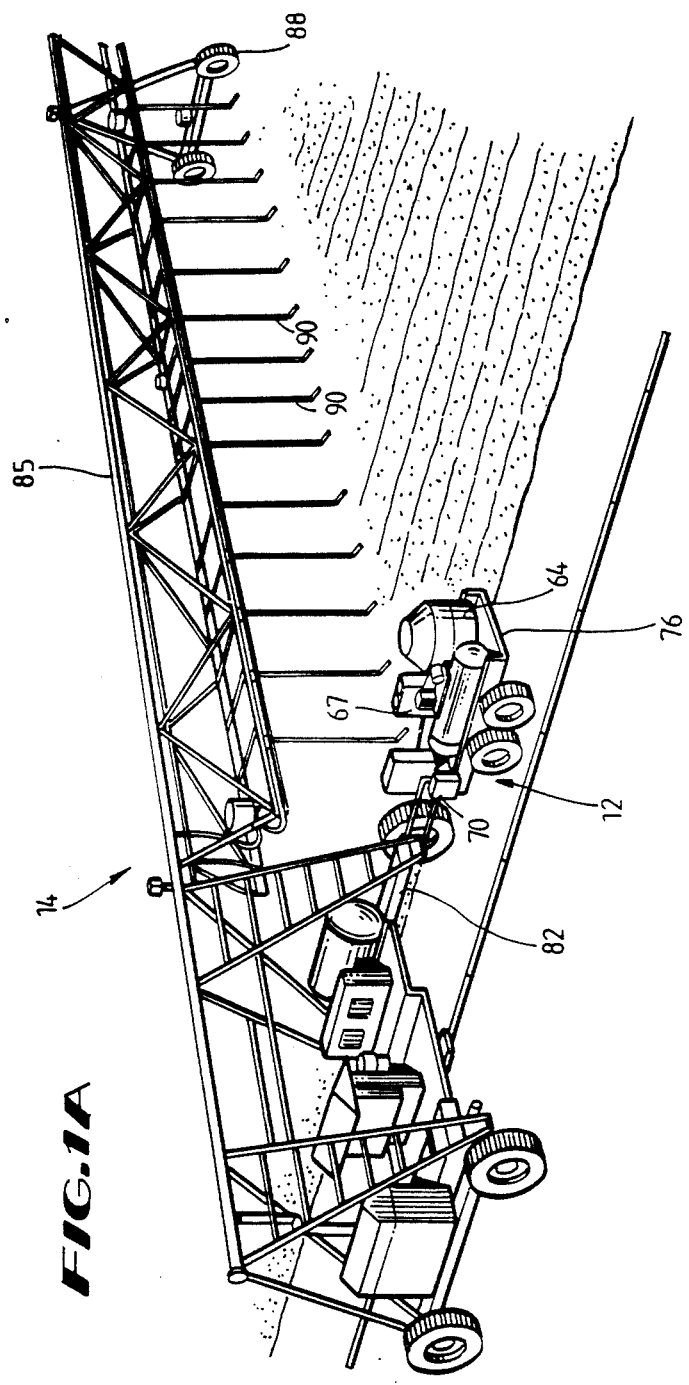

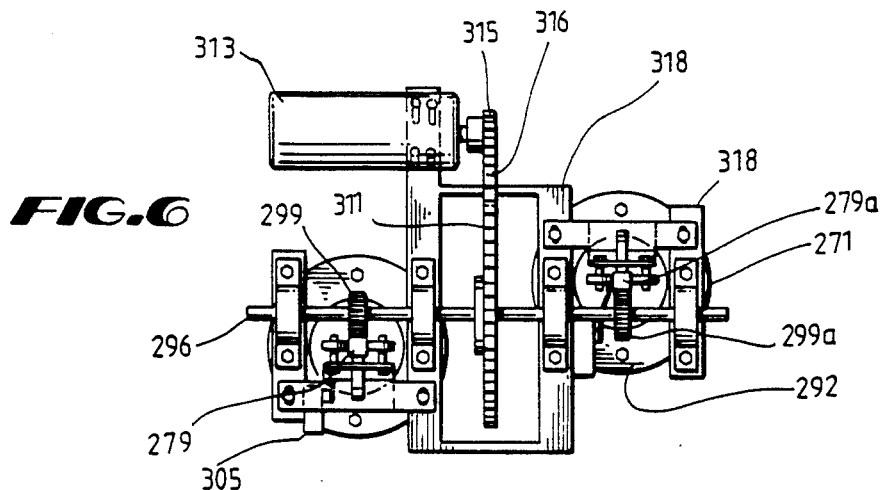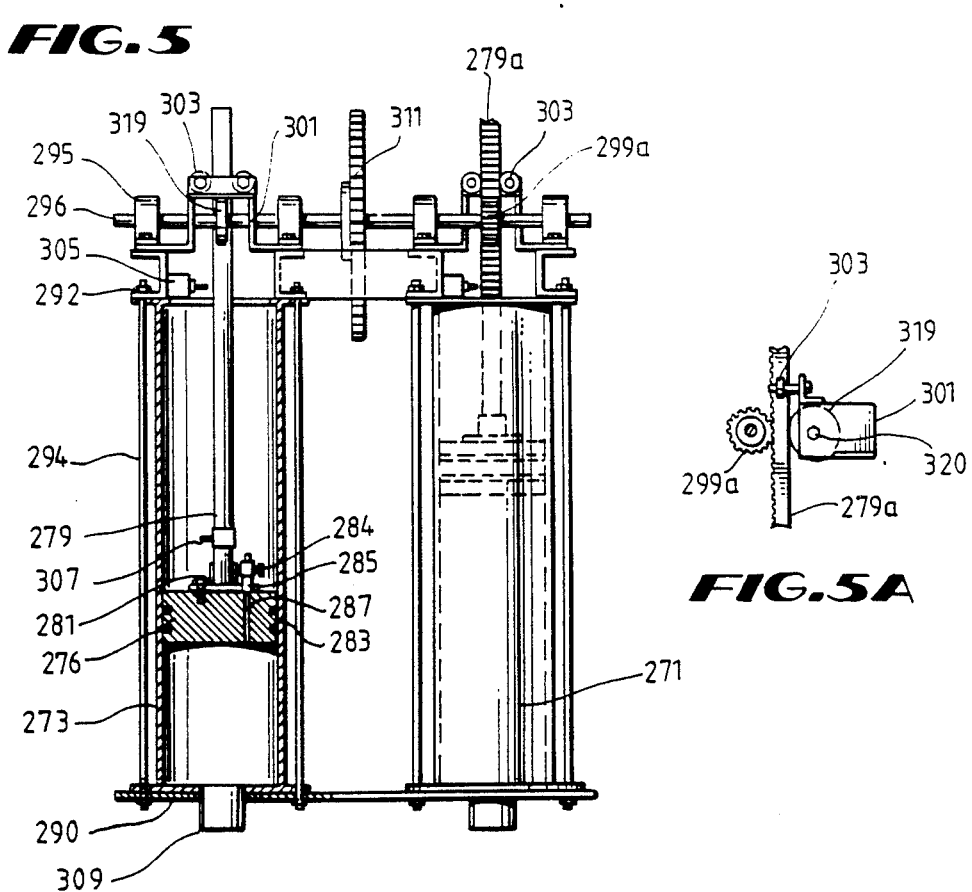

LEGEND
○ VALVE OPEN
⊗ VALVE CLOSED

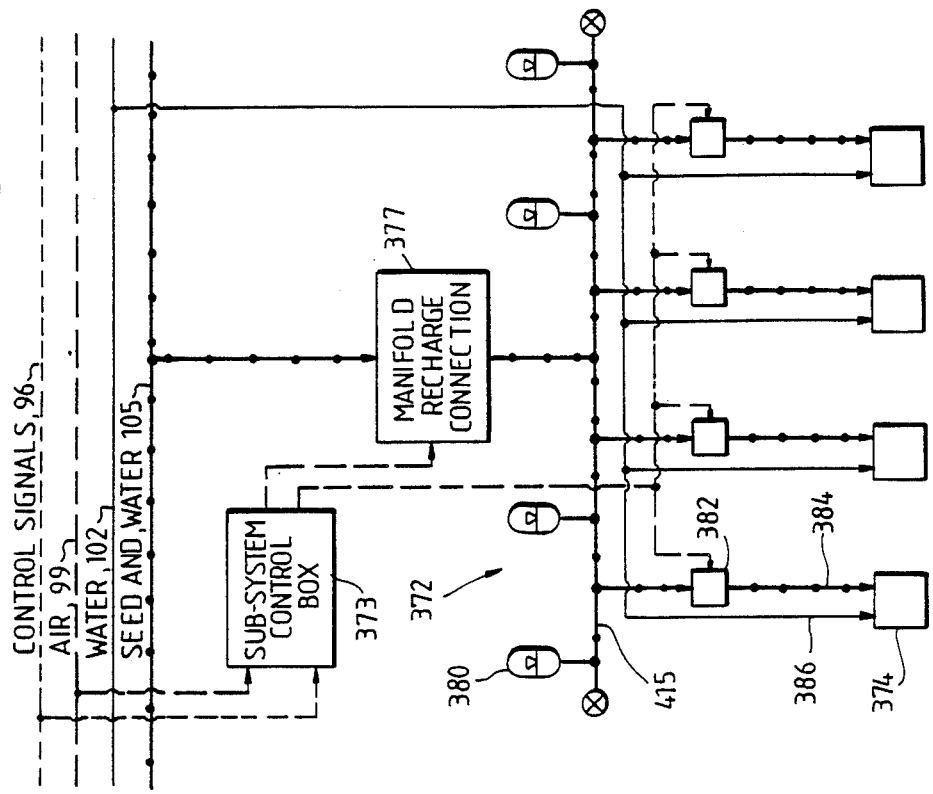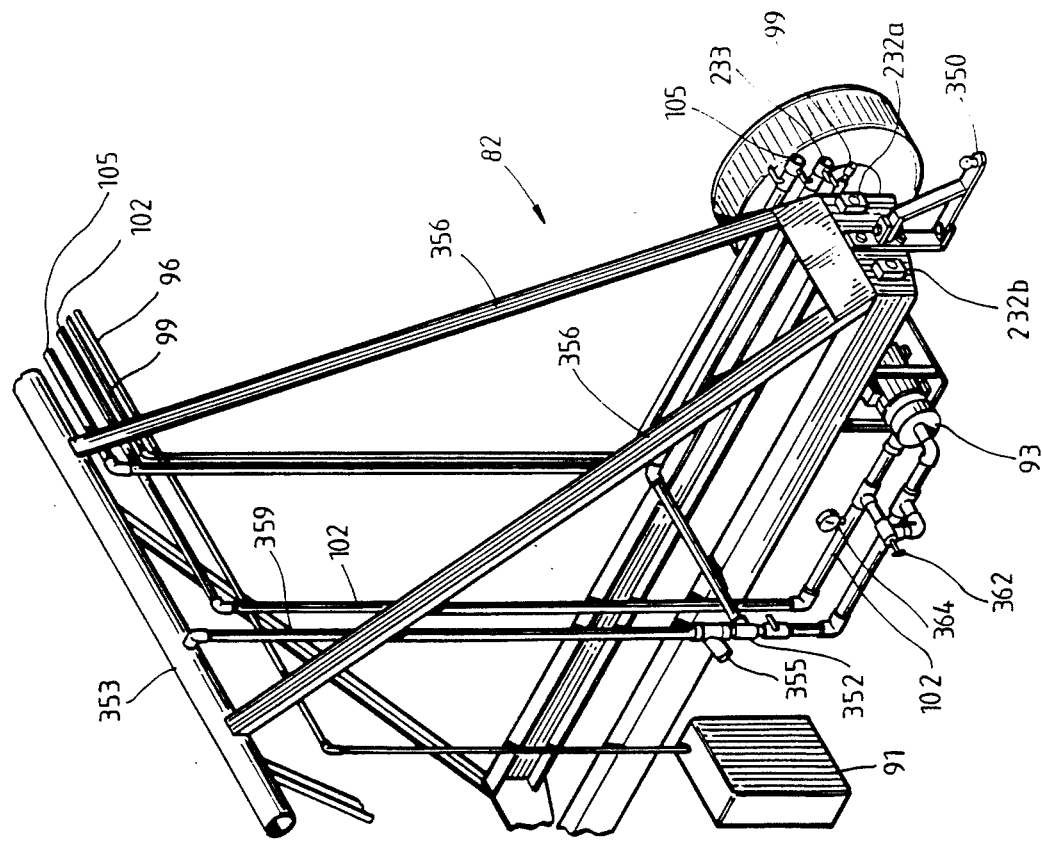

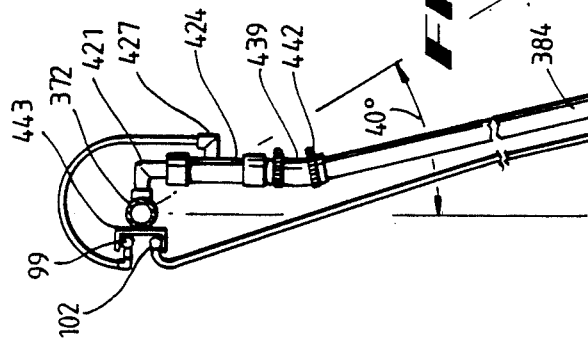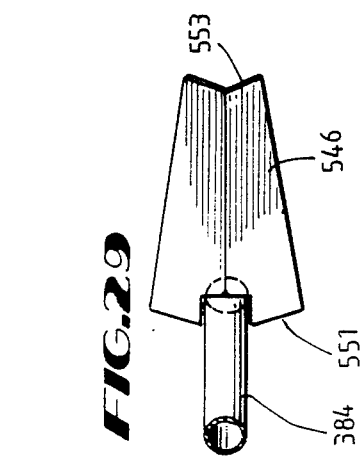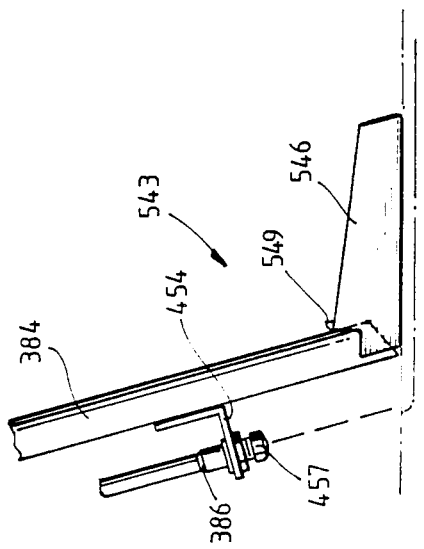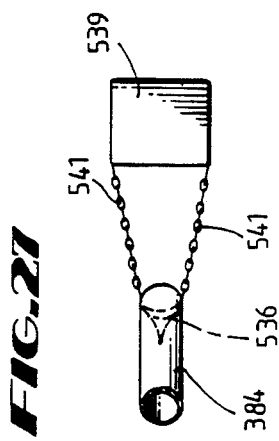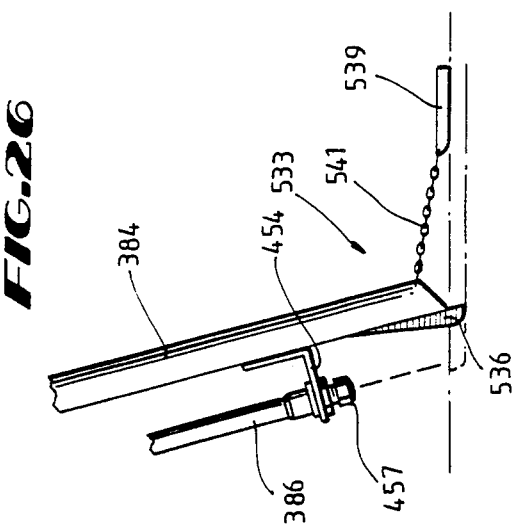

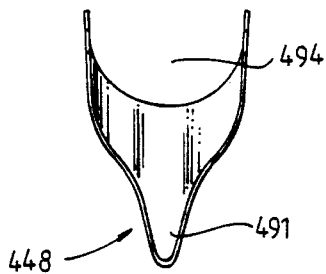
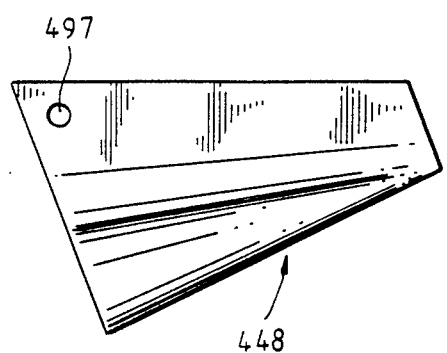
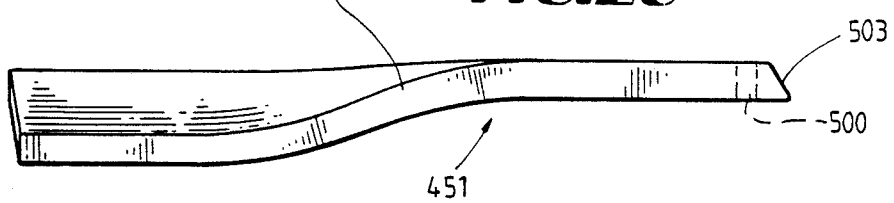
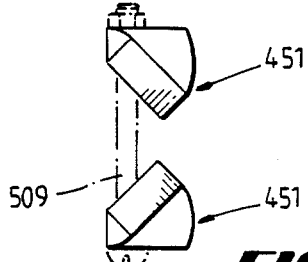
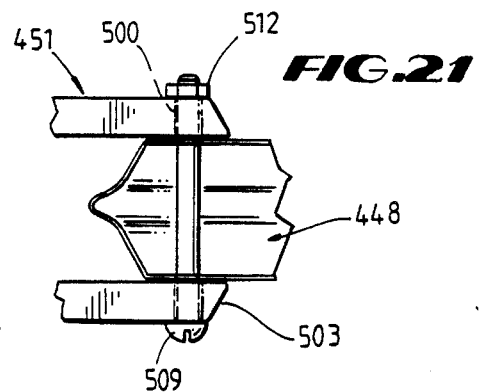

DISTRIBUTION MANIFOLD FOR MOBILE SPAN-AND-TOWER IRRIGATION SYSTEMS

CROSS-REFERENCES TO COPENDING APPLICATIONS

This is a divisional of copending application Ser. No. 150,776 filed on Feb. 1, 1988.

BACKGROUND OF THE INVENTION

The present invention relates to a hydraulic seed planter for a field planting system using large span and wheeled tower irrigation systems. More particularly, the invention provides apparatus which pre-germinates or primes seed, injects seed into a pressurized pipe transporting a stream of carrier water, distributes the seed and the carrier water to a plurality of manifolds each of which may be isolated from the supply pipe, and controls planting of the seeds from a manifold through a planting shoe which opens a furrow, places the seed in the furrow, and closes the furrow.

Planting of crop seed currently is limited primarily to tractor mounted or tractor drawn planters, which incorporate numerous types of seed metering systems. There are some crops which are seeded by airplane, but these are primarily limited to close seeded grain and cereal crops. Broadcast seeding through a ground applied fertilizer suspension has been attempted with varying degrees of success. Under development by the University of Georgia at Tifton, Ga. and Valmont Industries at Valley, Nebr. are seedagation systems in which seed is distributed through the main irrigation pipeline or an auxiliary pipeline and applied through large impact sprinklers. This may be considered a form of broadcast application with the seed remaining on the soil surface.

Various components of seed planting and irrigation systems have been described before. U.S. Pat. No. 4,300,461 issued to Hodge, et al. describes a seed planter which has a fluid injection soil opener. A seed applicator moves along the ground, and high pressure water discharged from a plurality of nozzles spaced along the applicator cuts narrow grooves in the ground. The seed is blown by air into the somewhat fluid soil. This device however, does not provide for covering the seed placed in the groove; instead, it relies on subsequent watering or rainfall to erode the grooves into themselves and effectively cover the seed.

It has further been known to use a liquid gel suspension to carry seeds from a storage container through a tube and into a furrow. U.S. Pat. No. 4,224,882 issued to Cruse describes an apparatus for sowing seeds in a liquid suspension. A peristaltic pump supplies the suspension to a furrow cut by a v-shaped coulter. The reference explains that the peristaltic pump does not damage seeds. However, it appears that the output performance of such a pump is influenced drastically by the pressure against which it pumps. For large span and wheeled tower planting systems, this type of pump and medium for carrying seed would not be practical Pressure differentials over these extended lengths would not permit uniform seed distribution along the planter.

U.S. Pat. No. 4,315,380 issued to Davidson describes a method of processing seeds or cereal to accelerate the natural germination of the seed. The seeds, steeped in water, are oxygenated in a temperature controlled container to pregerminate and/or store the seeds for planting.

As noted above, use of a liquid gel suspension has been used to meter seed into a furrow. Electronic metering devices described in U.S. Pat. No. 3,912,121 issued to Steffen and U.S. Pat. No. 4,333,096 issued to Jenkins et al., use electronic controls and microprocessors for tractor drawn seeding operations. These devices monitor and control the seeding rate. Jenkins '096 describes a dispensing mechanism which periodically dispenses seed through a chute into a furrow. A seed sensor provides an electronic signal to the monitor each time seed drops through the chute. A microprocessor counts the number of seeds planted in each row and alerts the operator if a stoppage occurs or if an excessive number of seed are being planted.

Steffen '121 describes an apparatus to control and maintain a preselected density of population of seeds delivered from a hopper by a seed dispensing mechanism to the furrows. The microprocessor controls the seed dispensing mechanism to increase, decrease, or hold constant the number of seeds dispensed, depending upon the number dispensed, the distance traveled, and the distance between rows.

U.S. Pat. No. 4,192,388 issued to Goebel describes disks to close ruts caused by the wheels of a center pivot or linear irrigation system running in wet soil. This reference describes the significant problem of operating heavy equipment through crop fields. Ruts are opened and crops are disturbed or damaged. Also the necessity to run a variety of tractor-drawn farm equipment through a field—i.e., tractors to plow and prepare fields, tractors to pull planters and plant seeds, tractors for cultivation and harvesting—all contribute to soil compaction, damage to crops and excess energy consumption. It is desirable to minimize the number of farm implements which must be used to farm land.

Mobile irrigation systems, which span across the crop field and which move through the field in either a linear or pivotal motion, offer the potential to reduce tractor-drawn operations by performing other functions in addition to irrigation. The framework of these large pipe span-and-tower systems provides a platform on which to install equipment to carry out additional farming operations. Precise chemical application for weed control from such an irrigation system, for example, can eliminate or reduce the need for the tractor-drawn plowing and cultivating operations. One such span-and-tower system is a multifunction irrigation system (MFIS) recently developed by The Texas A&M University System at the Agricultural Research & Extension Center in Lubbock, Tex. The A & M irrigation system provides uniform movement of the span-and-tower structure through a field and permits precise application of water and chemicals to the field and crops.

The A & M multifunction irrigation system incorporates two independent dynamic nozzle systems for precise water and chemical application. One set of nozzles is designated for water application through which chemicals may also be injected. The second nozzle system is exclusively for chemical injection. Many of the functions of the irrigation system include chemical application for the express purpose of reducing plant water stress by decreasing water loss from the soil and plants after irrigation. It further has the capability of precision application of other agricultural chemicals for the reduction of environmental stress on the plant, making it possible to reduce the need for tractors and other spraying equipment in the field after planting. Such a multifunction system provides the pipe span and wheeled tower structure to support a planting system of supply pipes, manifolds, drop tubes, and planting shoes as contemplated in the present invention.

BRIEF DESCRIPTION OF THE INVENTION

The present invention enables a typical span and tower irrigation system to perform an additional function, planting, through an apparatus which accurately places crop seed in a plurality of rows simultaneously. The apparatus is particularly adapted for use on large mobile span and tower irrigation systems and especially on, but not limited to, the multi-function irrigation apparatus developed by The Texas A & M University. In one aspect, the invention provides a tank or other apparatus to house a supply of seed for travelling with the irrigation system through a crop field. In another aspect, the invention meters the seed into a pressurized stream of water (separate from the main irrigation stream of water) which carries the seed along the span sections to the planting manifolds. In a preferred form, the metering is done by dual cylinders which alternately fill with seed from the seed storage housing and discharge seed into the carrier fluid.

The planting manifolds of the present invention are supported along the span sections. Depending from each manifold is a plurality of drop tubes, each of which terminates near the ground in a planting shoe. Extending upwardly from the manifold is a plurality of accumulators. Preferably, one accumulator is associated with each drop tube. The upper end of each drop tube preferably connects to its respective manifold through a tubular diaphragm valve. The tube valves along a given manifold are preferably opened and closed in unison using a controllable supply of pressurized air.

Each manifold connects to the pressurized supply of seed and carrier water through a manifold recharge pipe. Communication from the carrier pipe into the manifold is controlled by a recharge valve. Closing the recharge valve seals or isolates the manifold from the supply of seed and water. Closing the tube valves on a manifold seals the manifold from its depending drop tubes. Opening the manifold recharge valve permits water carrying a predetermined amount of seed to enter and to charge the manifold. The manifold valve closes when the manifold is recharged fully. The manifold, filled with seed and water, may thus be isolated from the pressurized carrier water and seed supply pipe and from its seed planting drop tubes.

The capability to isolate the seed-planting manifolds from the pressurized supply pipe provides for uniform planting of seed. Many pipe spans connect together between wheeled towers, to form a typical, long, chain-like pipe span-and-tower system. Seed and water discharge from the manifolds is not affected by the recharge cycle because the manifolds close the supply pipe from the planting drop tubes which are open to the atmosphere while discharging. Charging a manifold takes a brief period of time, depending on the carrier water pressure. Substantial uniformity of pressure and separately controllable recharge/discharge times promote uniform distribution of seed to each manifold along the span-and-tower system and also promotes uniform distribution of planted seed in the field.

After the manifold recharge valve closes, the water and seed in the manifold stop moving and stabilize. The manifold controller vents the pressurized air to briefly stop the supply of air to the tube valves on the manifold. The tube valves simultaneously open and the manifold is then open to the atmosphere. The supply of water in the manifold discharges through the tube valves and down the drop tubes to the planting shoes. The water washes the seed from the manifold through the drop tubes to the planter shoes. The air is switched on by the controller, and the tube valves close in unison to again isolate the manifold. The cycle of recharging the manifold, isolating the manifold, and discharging the manifold continues for each manifold along the spans as the span-and-tower structure moves through the field.

The seed transferred from the supply tank to the stream of carrier water is uniformly suspended in a gel. Further, when the gel is metered into the supply of carrier water, the seed is uniformly distributed in the carrier water.

The invention in a preferred form provides a dual cylinder pump to inject the seed suspension into the carrier water. Both cylinders connect to the seed supply tank and to the carrier water supply pipe. One cylinder fills with the seed and gel suspension, while the other cylinder discharges its supply of suspended seed and gel into the pressurized carrier water Appropriate alternating valves open and close to direct the flow of seed and gel into and from the cylinders.

The planting system of the present invention further provides a germination facility which is normally separate from the planting apparatus. This facility includes a gel mixing tank in which to prepare the aqueous gel. It also includes a separate gel and seed mixing tank used to pregerminate or to prime the crop seed before mixing the seed with the gel. Preplant priming of crop seed or pregermination of crop seed eliminates or greatly reduces many emergence and stand establishment problems The present invention normally includes a mobile seed transport and injection unit mounted on a trailer which connects to and is pulled by a control platform on the pipe span-and-tower system. The trailer transports seed primed or pregerminated (if appropriate) from the germination facility. Apparatus on the trailer then functions to meter the seed from the supply tank and to inject the seed into the carrier pipe of the planting system. The mobile transport and injection unit normally includes the positive displacement dual cylinder injection apparatus with which to remove seed from the holding tank and to meter it accurately into the pressurized supply of carrier water.

A pressurized stream of water flows through the supply pipe to carry the seed along the chain-like system to distribution manifolds suspended from the span sections between towers. Each span section may support more than one manifold. In a preferred embodiment, each span section has two manifolds and each manifold distributes seed to 16 furrows through drop tubes depending from the manifold towards the ground.

Each manifold of the invention includes the drop tubes which convey the seed and water from the manifold to the ground. Attached to the bottom of each drop tube is the planting unit which includes an angled perforated tube, a planting shoe, and a furrow closer. Each drop tube includes an associated separate water supply tube which connects to a supply pipe on the span structure. Each water supply tube hangs from the manifold and is secured parallel to its associated drop tube. The water supply tube terminates at its distal end above the ground with a solid stream spray nozzle which is supported at the connection of the drop tube and the perforated tube.

A manifold connector communicates water and seed to each manifold from the water and seed supply pipe supported in the overhead span between the towers. A valve between the connector and the seed/water supply pipe opens to permit water and seed to enter the manifold. Air filled storage tanks called accumulators are connected to the horizontal pipe of the manifold, and these accumulators extend above the horizontal manifold pipe. There is normally one accumulator for each drop tube in the manifold. During the recharge of the manifold, the tube valve at the upper end of each drop tube is closed. Opening the connector valve enables water and seed from the supply pipe to enter the manifold. The seed travels down through the connector which preferably has a series of offset horizontal ledges or baffles in the two foot connector pipe. The ledges and the turbulent flow of water through the pipe help to keep the seed evenly distributed in the water and to prevent the seed from accumulating in the elbow connector to the horizontal manifold pipe. Water is carried into the accumulators and pressurizes the air inside each accumulator. The seed is substantially uniformly distributed along the horizontal manifold pipe.

When a manifold inlet valve is closed, a short delay allows the manifold to stabilize, i.e., the water to stop moving and the seeds to begin to settle. The air pressure on the tube valves is released and a collapsed latex tube within each tube valve opens. The water under pressure in the accumulators discharges through the horizontal manifold pipe and into the drop tubes. This flushes the seeds from the horizontal pipe through the tube valves and down the drop tubes. Simultaneously, water channels through the water supply tubes and through the trenching nozzles under relatively high pressure to dig trenches or open the furrows in the ground. The water carrying the seed enters the perforated angled tube which breaks the force of the falling water. The water sprays or drips from the perforated tube and the seed falls down the tube, past the shoe and into the furrow. The shoe is pulled along the opened furrow to firm and widen the furrow. An angled trench closer connected to the shoe pushes some of the soil dislodged by the spray nozzle back into the furrow to close the furrow.

This addition of planting capability to a span and tower irrigation system has the potential to significantly impact current farming practices, crop yields, and water conservation. It is contemplated that the accurate placing of primed or pregerminated seed into the stubble of a previous crop and simultaneous covering of the seed with an evaporation suppressant or aqueous gel and adequate water for germination and growth, will eliminate or greatly reduce emergence and stand establishment problems. It is also contemplated that significant crop yield increases can result from a substantially tractor-free and thus compaction-free field, protected by standing stubble. Stubble, together with the possible use of various soil surface control agents or evaporation suppressants, provides lower evapotransporation of water from the plants and from the soil than do other methods such as a plowed cleared field. A primary advantage of the present invention, therefore, is the capability for total no-till farming from the planting of a crop seed to irrigation and fertilizing by a span and tower-type system moving at a uniform rate through a field. Thus, water and agricultural chemical inputs such as herbicides, pesticides and fertilizers, may be applied to crop plants more accurately and timely than is possible with existing methods and apparatus.

In particular, the planting system of the present invention provides controlled seed distribution across rows on a large scale. The seed is distributed through manifolds suspended from overhead span sections. The manifolds recharge, isolate, and discharge in sequence along the span-and-tower structure under microprocessor control. The seed is suspended in a gel to meter the seed uniformly into a carrier water and thus into the field. A positive displacement injection system, nondestructive to pregerminated seed, injects a controllable amount of seed into the supply of carrier water. Due to its positive displacement characteristics, the injection system is not sensitive to back pressure. The seed distribution manifolds utilize accumulators to receive and pressurize the water carrying the seed for planting. The use of the accumulators enables separate intervals for recharging the manifold and discharging the manifold, while providing controlled pressurized discharge of the water and seed through drop tubes to a furrow excavated by a high pressure stream of water from a nozzle adjacent to the lower end of the drop tube. Each drop tube includes a nondestructive, air-actuated tube metering valve. The valves, operated in unison provide for isolation and pressurization of the manifold distribution system. Finally, each hydraulic planting unit, itself located at the lower end of the drop tube, excavates a furrow in the ground, dissipates the energy of the seed carrying water so that the planted seed is not washed from the furrow by the very water carrying the seed to the furrow, places the seed in the moist furrow, and covers the seed with moist dislodged soil to allow optimum germination and emergence.

BRIEF DESCRIPTION OF THE DRAWINGS

Objects and advantages of the present invention will become further apparent upon reading the following detailed description and upon reference to the following drawings, in which like elements have like identifiers.

FIG. 1A is an orthographic view of a seed planter system similar to that shown in FIG. 1 mounted to a typical mobile span and wheeled tower irrigation system.

FIG. 5 is a cross-section, schematic view of a dual cylinder seed/gel injector of the present invention.

FIG. 5A is a detailed illustration of the rack-and-pinion gear which raises and lowers the piston in the seed/gel injector cylinders as illustrated in FIG. 5.

FIG. 6 is a top view of the dual cylinder injector illustrated in FIG. 5.

FIG. 7 is a top view of the valve tree and tubing to connect the dual cylinders to a supply of seed and gel and to dispense seed and gel from the dual cylinders.

FIG. 9 is an orthographic view of a control platform and connections to the trailer.

FIG. 10 is a schematic diagram of a seed and water distribution manifold supported by a span section of the irrigation system.

FIG. 13 is an illustration of a planter drop tube and planting unit of the present invention.

FIG. 17 is a front view of a hydraulic planter shoe of the present invention.

FIG. 18 is a side view of a hydraulic planter shoe of FIG. 17.

FIG. 19 is a side view of a trench closer of the present invention.

FIG. 20 is a top view of the trench closer of FIG. 19.

FIG. 21 is a partially cutaway top view illustrating the connection between the planter shoe of FIG. 17 and the trench closer of FIG. 19 of the present invention.

FIG. 22 is an end view of the trench closer of FIG. 19.

FIG. 26 is a detailed side view of an alternate planter shoe for use preferably with the drop tube illustrated in FIG. 25.

FIG. 27 is a top view of the planter shoe illustrated in FIG. 26.

FIG. 28 is a detailed side view of the alternate planter shoe illustrated with the drop tube of FIG. 25.

FIG. 29 is a top view of the planter shoe illustrated in FIG. 28.

DESCRIPTION OF THE PREFERRED EMBODIMENTS

Components and preferred embodiments of the invention will be described with specific reference to the drawings briefly described above.

Figure 1:
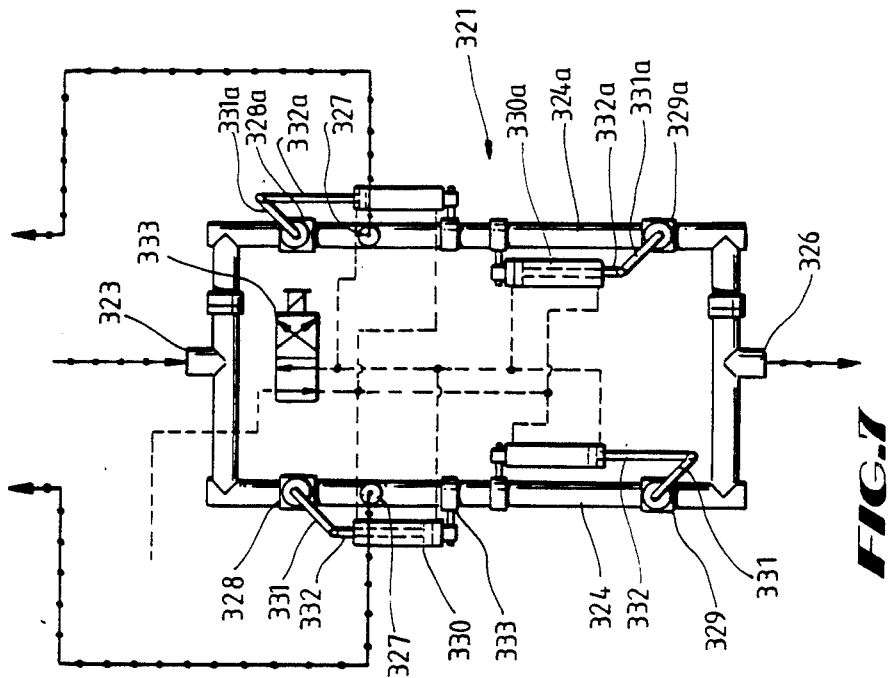
FIG. 1 is a schematic diagram of an overall planting system of the present invention.

The present invention provides a system for use in a field to plant seeds in a number of furrows across the field simultaneously. Preferably, the seeds are planted a predetermined distance apart in each furrow. The present invention also provides a system to pre-germinate seeds prior to planting. FIG. 1 is a schematic diagram which illustrates the overall planting system of the present invention. Broadly, the present invention has three functional areas: a germination facility 10, a seed transport and injection unit 12, and a seed distribution system or planter 14 attached to a span and tower mobile structure. The germinating facility 10 includes a gel mixing tank 17 which has a dry gel inlet 19 and a water inlet 21. A gel outlet 24 connects to a pump 27. The germination facility 10 also includes a germination tank 30 and an air compressor 31. The tank 30 has a gel inlet 33, a water connection 36, a port 39 for introducing seed into the tank 30 and a port 40 for compressed air. The germination tank 30 also includes a water pump 42 to which is connected a water recirculation outlet 45 from the tank 30 and a water recirculation inlet 48. An outlet 51 in the germination tank 30 permits removal of germinated seed. In a preferred embodiment, the inlet 33 used to add gel to the tank 30 may be used as an outlet for removing the seed and gel mixture instead of having a separate port 51.

The seed/gel injector trailer 12 includes a seed and gel holding tank 64 and a two cylinder injection pump 67. A controller 70 for the injection unit is installed on the trailer 12 together with a water pump 73 and an air compressor 76.

The tower and span planter 14 includes a control platform 82 and a plurality of span sections 85. The ends of the span sections are supported by wheeled towers (not illustrated). The control platform 82 supports a microprocessor controller 91. A booster pump 93 mounted on the platform 82 connects to a pressurized source of water 94. The control platform 82 and each span section 85 includes an electrical control cable or conduit 96, a pressurized air supply tube 99, a water supply pipe 102, and a water and seed mixture supply pipe 105. The schematic of the preferred embodiment illustrates that each span 85 preferably supports two planter manifolds 108 and 111.

The orthographic view in FIG. 1A illustrates the components of the seed transfer and injection unit 12 joined to a typical mobile span-and-wheeled tower irrigation system 14. This embodiment illustrates but one manifold between the wheeled towers 88. Without showing much detail, each span section 85 supports the various conduit and tubes for the electrical controls, for the supply of pressurized air, for the supply of pressurized water, and for the supply of the water and seed mixture. The seed transfer and injection unit 12 preferably is a wheeled trailer which couples to the control platform 82. Supported on the seed transfer unit 12 is the seed and gel holding tank 64, the dual cylinder injector 67, and the air compressor 76. Depending from the span 85 are a plurality of paired hydraulic trencher water supply lines and planter drop tubes 90.

Figure 2:
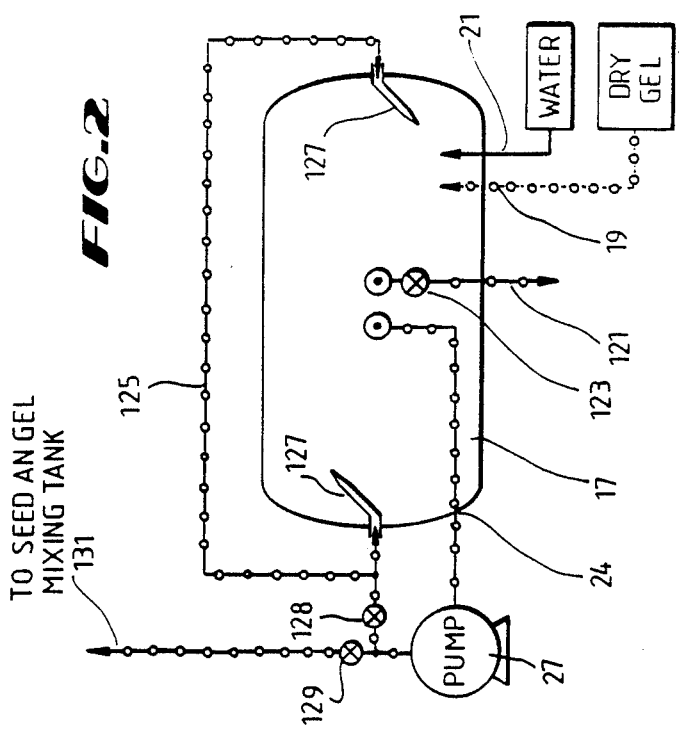
FIG. 2 is a cross-section view of the gel mixing tank of FIG. 1.

Turning now to FIG. 2, the germination facility 10 has the separate cylindrical gel mixing tank 17. The tank 17 includes the inlet 19 for dry gel, the water inlet 21 which is connected to a source of water, a drain pipe 121 and a valve 123. The gel outlet 24 connects to the gel pump 27. A recirculation pipe 125 connects to two mixing nozzles 127 inside the tank 17. A valve 128 and a valve 129 on the discharge side of the pump 27 cooperate to direct the mixed gel from the tank 17 back into the tank 17 through the recirculating pipe 125 or to the seed and gel mixing tank 30 through a pipe 131.

Figure 3:
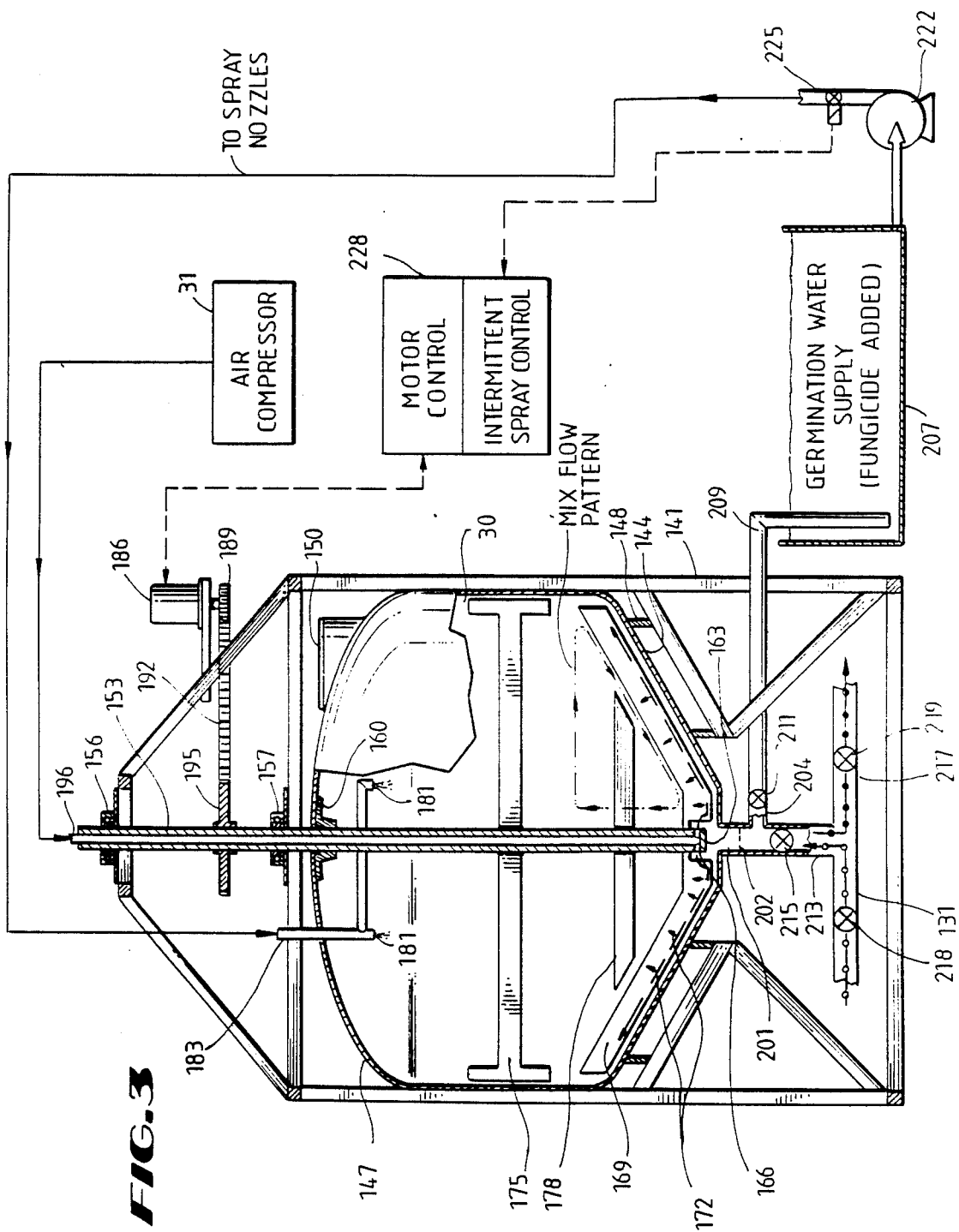
FIG. 3 is a cross-section view of a combination germinator and seed-gel mixing tank of the present invention.

FIG. 3 is a cross-section view of the combination germinator and seed/gel mixing tank 30. A tank stand 141 forms a frame to surround and support the germinator tank 30. The tank 30 preferably has a cone bottom 144 and a dome cover 147, and rests on a plurality of support members 148 connected to the frame 141. The dome 147 has a removable cap 150 which may be closed to form an airtight seal for the tank 30. Vertically disposed along the longitudinal axis of the tank 30 is a hollow shaft 153. The shaft 153 is supported in the tank stand 141 by an upper set of bearings 156 and a lower set of bearings 157. The bearings 156 and 157 connect to members of the frame 141. The shaft 153 passes through an airtight seal 160 in the dome 147. The lower end of the shaft 153 has a cap 163; the side walls of the shaft 153 adjacent to the cap 163 have open apertures 166. A lower mixing paddle 169 communicates with the apertures 166 and has a plurality of vents 172 disposed along the upwardly angled paddle arms 169. Other mixing paddles such as the tee mixing paddle 175 and the mixing paddle 178 are vertically spaced and are rigidly bolted to the hollow shaft 153. A plurality of spray nozzles 181 are supported from the dome 147 and connect through a pipe 183 to a water pump 222. Mounted to the upper section of the tank stand 141 is a paddle drive motor 186. The motor 186 has a drive gear 189 which connects by a chain 192 to a gear 195 mounted to the hollow shaft 153. The upper end 196 of the hollow shaft 153 couples to the air compressor 31 or other source of pressurized air or oxygen.

Located at the bottom of the tank 30 is a drain pipe 201 which includes a butterfly screen valve 202. A tee connector 204 connects the drain pipe 201 to a germination water supply tank 207 through a return pipe 209. The return pipe 209 includes a ball valve 211. The pipe 201 further connects to a second tee connection 213. That tee connector 213 also has a ball valve 215. The tee connector 213 joins the gel supply pipe 131 from the gel mixing tank 17 with the seed/gel supply pipe 217. A valve 218 is disposed in the gel supply pipe 131 and a valve 219 is disposed in the seed/gel supply pipe 217.

The water supply for the germination tank 30 includes a water pump 222 and a supply pipe 225 which connects to the pipe 183. A control box 228 includes switches for operating the paddle drive motor 186 and the water pump 222. It also controls the time intervals for intermittent spray germination.

Figure 4:
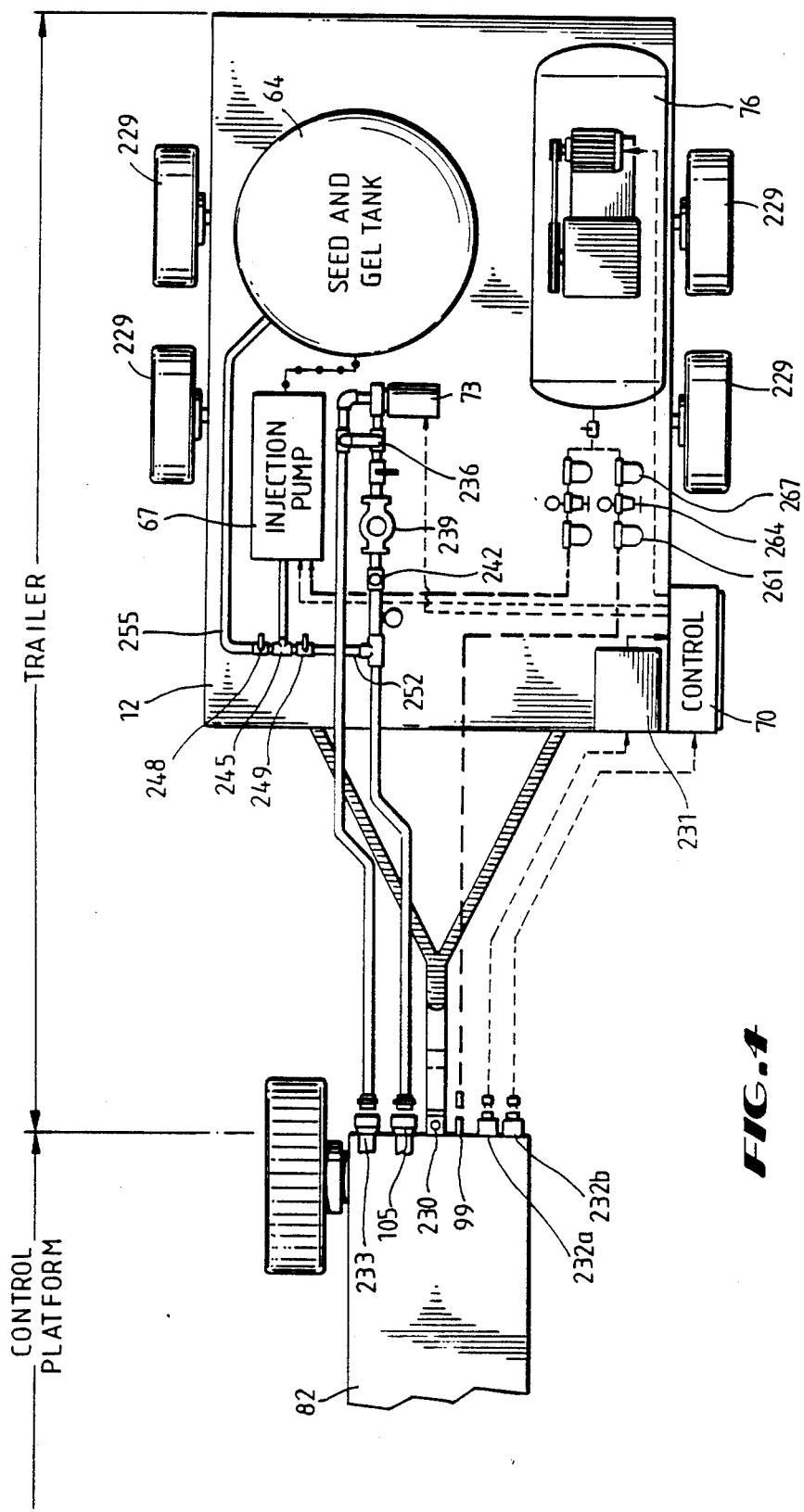
FIG. 4 is a schematic top view of the seed injection trailer of FIG. 1 which is connected to the control platform of the span and tower irrigation system.

FIG. 4 is a top view of the seed transport and injection unit 12. A preferred embodiment uses a trailer for the unit 12. The trailer 12 has wheels 229, and a coupling 230 connects the trailer to the control platform 82. Mounted on the trailer 12 is the air compressor 76, the seed and gel holding tank 64, the two cylinder injection pump 67, the electronic injection controller 70, a transformer 231 and a water pump and motor 73. The electronic controller 70 connects to a 480 volt power source 232a through a transformer 231 and to a 120 volt power source 232b. The seed transport and injector unit 12 also includes a water supply line 233 which connects to the pump 73. On the output side of the pump 73 is a pressure regulator 236, a water meter 239, a one-way valve 242 and the seed and water supply pipe 105. A tee connection 245 extends from the injection pump 67, and the valves 248 and 249 are positioned on either side of the tee connection 245. A pipe 252 connects one side of the tee 245 to the water and seed pipe 105, while another pipe 255 provides a return to the seed and gel tank 64. The supply of compressed air 99 passes through two sets of an oiler 261, a pressure regulator 264, and a filter 267, which are in-line on parallel outlets on the sides of the air compressor 76. One supply line operates the outlet manifold tube valves on the planting unit, while the other supply line operates the valves for the injection pump 67.

The two-cylinder injection pump 67 of the present invention is illustrated in cross section in FIG. 5. The pump 67 includes two cylinders 271 and 273. Components of the cylinders are identical, and the following discussion refers to identified components of the cylinder 273. Where appropriate, the components of the cylinder 271 will have a suffix "a" with the component identifier. Each of the cylinders 271 and 273 includes a piston 276 connected to the lower end of a rack 279 by a mount 281. An opposing seal 283 seals the piston against the cylinder 273. A vent valve 284 connects to the flange 285 of the mount 281. The vent valve 284 communicates with a bore 287 through the piston 276.

The cylinders 271 and 273 mount between a lower mounting frame 290 and an upper mounting frame 292. Tie rods 294 arranged circumferentially around the cylinders 271 and 273 couple the upper mounting frame 292 with the lower mounting frame 290. Connected to the upper mounting frame 292 are pillow block bearings 295 which support a shaft 296. A pinion gear 299 connects to the shaft and engages the teeth of the rack 279. A rack guide mount 301 supports a side sway guide bearing 303. Secured to the upper mounting frame is a limit switch 305. A limit stop 307 connects to the lower end of the rack 279. The top of the cylinders 271 and 273 are closed, and the bottom of each cylinder is open to a separate seed and gel port 309. A sprocket 311 is securely fastened to the shaft 296 midway between its ends.

Turning now to FIG. 6, there is shown a top view of the dual cylinder seed/gel injector pump 67. A variable speed DC motor 313 is supported on the upper mounting frame 292. A sprocket 315 driven by the motor 313 turns a chain 316 which engages the sprocket 311. As illustrated in FIG. 6, the rack 279 for the cylinder 273 is on an opposite side of the shaft 296 and pinion gear 299 than is the rack 279a for the cylinder 271. A support bar 318 rigidly connects the pillow block bearings 295 with upper mounting frame 292.

FIG. 5A is a side view of the engagement of the rack 279a with the pinion 299a. A back roller 319 supports the rack 279a. The back roller 319 rotates around a pin 320 through the rack guide mount 301.

Turning now to FIG. 7, horizontally disposed beneath the injector pump 67 is the seed/gel injection pipes and valves 321. A seed/gel inlet port 323 connects to parallel branches 324 and communicates through a pipe, not illustrated, with the seed and gel supply tank 64. The branches 324 rejoin to form a seed/gel outlet port 326 which connects to the pipe 252. An aperture 327 in the upper face of each of the branches 324 connects with the seed/gel port 309 from each of the cylinders 271 and 273. An input control valve 328 is placed in each branch 324 between the aperture 327 and the inlet port 323. An outlet valve 329 is placed in each branch 324 between the aperture 327 and the seed/gel outlet port 326. A double acting air cylinder 330 couples the piston arm 332 of the air cylinder 330 to the arm 331 of each valve 328 and 329. A coupler or mounting bracket 333 attaches the cylinder 330 to the branch 324 and supports the air cylinder 330. Similar air cylinders 330 and 330a are mounted on the branch tubes 324 and connect to the valve arms 331 and 331a of the valves 328a, 329, and 329a.

FIG. 9 illustrates the connection points on control platform 82 which connect with the mobile seed/gel injector unit 12 (the latter shown in FIG. 4). A trailer hitch 350 locks to the coupling 230 of the trailer 12 illustrated in FIG. 4. Mounted on the control platform 82 is the booster pump 93 and the microprocessor controller 91. The main water pipe 353 of the base irrigation system is secured by support frame members 356 over the control platform 82; and the pipe 353 extends out to the spans 85 perpendicular to the longitudinal axis of the control platform 82. A water tube 359 branches from the water pipe 353, and through a tee 352 couples to the water supply line 233 for the seed and gel trailer 12. A filter 355 may be placed in the water line 359. The water line 359 also connects to the booster pump 93 which discharges pressurized water into the water line 102. The pressure of water flowing from the pump 93 may be controlled by a regulator 362 and monitored on a gauge 364. The line 102 extends parallel to the irrigation supply pipe 353 along the span sections 85 of the tower and span planter 14. The control platform 82 also carries the water and seed line 105 and the compressed air line 99, both of which extend parallel to the water supply pipe 102 on the tower and span planter 14. The connections 232a and 232b supply electrical power to the injection trailer 12.

FIG. 10 is a schematic diagram of the control and fluid flow lines for a plurality of drop tube planters suspended from a span section 85 of the span and tower planter 14. The span sections 85 between the elevated towers support the control signal conduit 96, the air line 99, the water supply pipe 102 and the seed and water supply line 105. The air line 99 and control signal conduit 96 communicate between a distribution control panel 91 on the control platform 82 and a manifold subsystem control box 373. A seed and water manifold 372 supplies the seed and carrier water to a plurality of hydraulic planter units 374. Each drop tube planter includes an accumulator 380, a tube valve 382, a planter drop tube 384, an hydraulic planter unit 374 and an hydraulic trencher supply line 386. Disposed between the seed and water supply line 105 and the manifold 372 is a manifold recharge connector 377.

Figure 11:
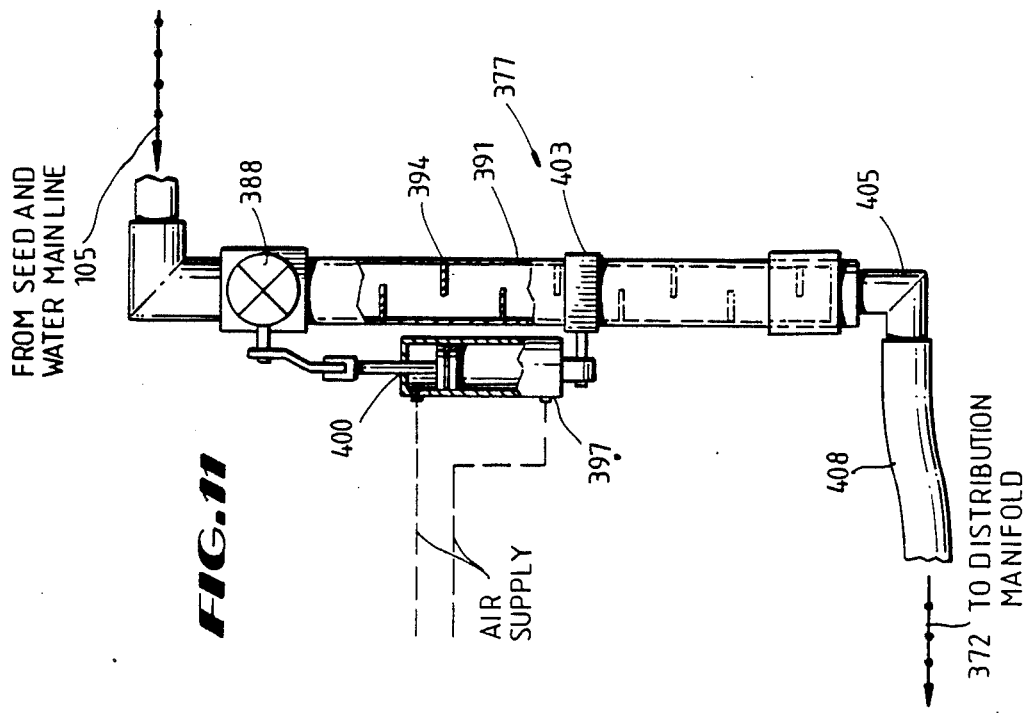
FIG. 11 is a detailed view of a manifold recharge connector of the present invention.

Turning now to FIG. 11, there is illustrated in cross section a detailed view of the manifold recharge connector 377. The manifold recharge connection 377 is disposed vertically from an overhead span section 85 and is positioned preferably half way between the ends of the manifold 372 to which it is connected The upper end of the manifold recharge connection 377 connects to the seed and water main line 105. A ball valve 388 is attached at the upper end of the connector 377 after the connection to the line 105. A recharge tube 391 depends vertically from the ball valve 388. The recharge tube 391 has an internal ladder or baffle system 394 illustrated in phantom. The ladder 394 defines off-set perpendicular ledges internal to the recharge tube 391. A double action air cylinder 397 connects by an arm 400 to the ball valve 388. A cylinder mount 403 clamps to the recharge tube 391 and supports the air cylinder 397. An elbow connector 405 attaches at the lower end of the recharge tube 391 and a rubber flexible hose 408 connects the elbow 405 to the seed distribution manifold 372.

Figure 12:
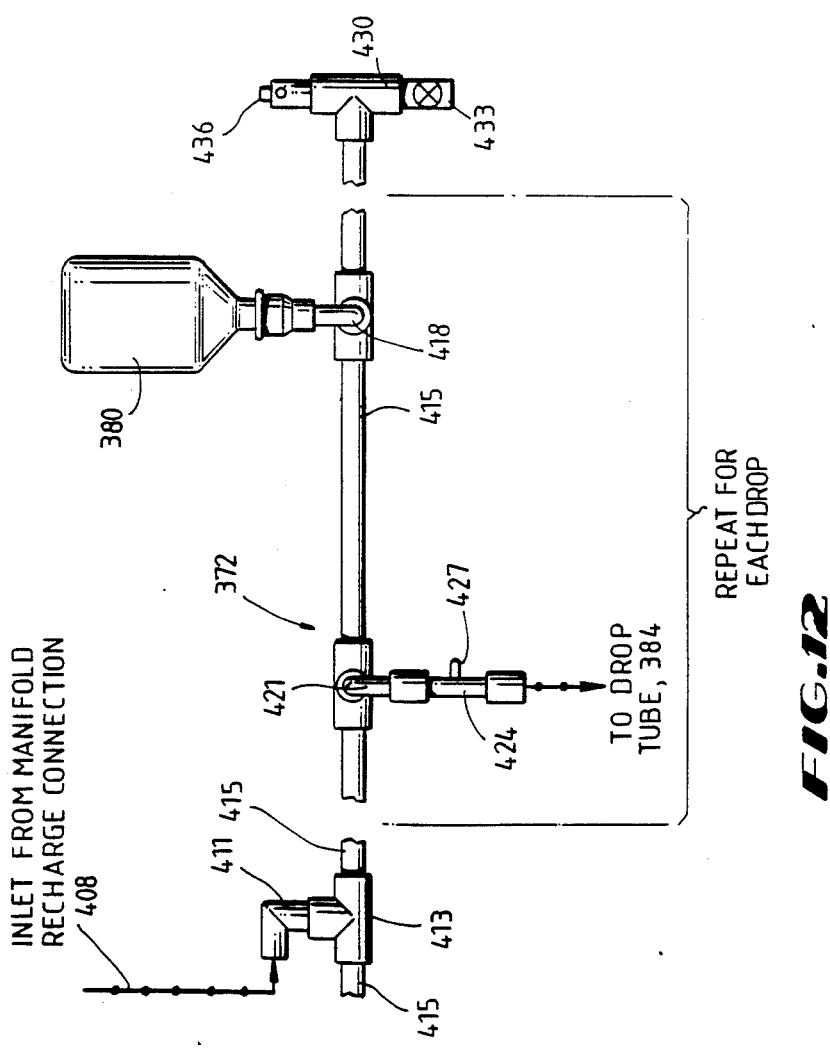
FIG. 12 is a detailed illustration of a distribution manifold.

FIG. 12 provides a detailed illustration of a portion of the seed distribution manifold 372. The hose 408 from the manifold recharge connector 377 attaches to the inlet elbow 411 of the distribution manifold 372. The elbow 411 couples to a tee connector 413 medial the ends of the distribution manifold 372. A manifold pipe 415 extends from either end of the manifold tee 413. An upwardly extending elbow 418 connects the accumulator 380 to the manifold pipe 415. In a preferred specific embodiment, each accumulator is cylindrical and holds about two liters A downwardly extending elbow 421 connects the manifold pipe 415 to the tube valve 424 for the hydraulic planter unit (not illustrated in FIG. 12). The tube valve 424 has a port 427 which is coupled to the supply of pressurized air 99 through a tube not illustrated. At each of the distal ends of the manifold pipe 415 is a tee connection 430. The lower end of the tee 430 terminates in a drain valve 433, and coupled to the upper end of the tee 430 is an air relief valve 436.

FIG. 13 provides a detailed illustration of the planter drop tube 384 which is suspended from the seed distribution manifold 372. Each manifold 372 preferably supports a plurality of planter drop tubes 384, and in a preferred embodiment, the manifold has about 16 drop tubes 384. The illustrated drop tube 384 connects to the tube valve 424 by a flexible hose 439. The hose 439 is secured to the tube valve 424 and the upper end of the drop tube 384 by appropriate screw clamps 442. The hydraulic trencher supply line 386 extends downwardly from the seed distribution manifold 372 parallel to the planter drop tube 384 and terminates above the ground in a spray nozzle 457. Connected to the lower end of the drop tube 384 is the hydraulic planter unit 374 which is better illustrated in FIG. 15. A metal manifold support member or channel 443 connects to the span and tower irrigation system. The pressurized water supply line 102 and the supply line 99 of pneumatic control air for the tube valves 382 are supported by the U-shaped channel 443.

The planter unit 374 (shown in detail in FIG. 15) connects to the lower end of the drop tube 384. The unit 374 includes metal screen tube 445, a planter shoe 448 and a pair of trench closers 451. An L-shaped mounting bracket 454 secures to the lower end of the drop tube 384 forward of the tube 445. A trenching nozzle 457 bolts in the bracket 454 and connects to the hydraulic trencher supply line 386.

Figure 25:
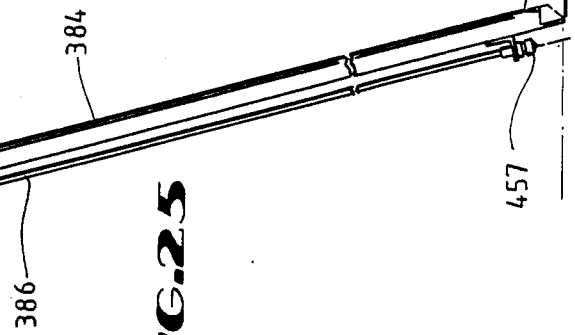
FIG. 25 is a alternate embodiment of the drop tube of the present invention with an alternate planter shoe disposed at the lower end of the drop tube.

FIG. 25 illustrates an alternate embodiment of the planter drop tube 384 which is suspended from the seed distribution manifold 372. This embodiment places a perforated tube 445a between the flex tube 439 and the lower end of the drop tube 384.

Figure 14A:
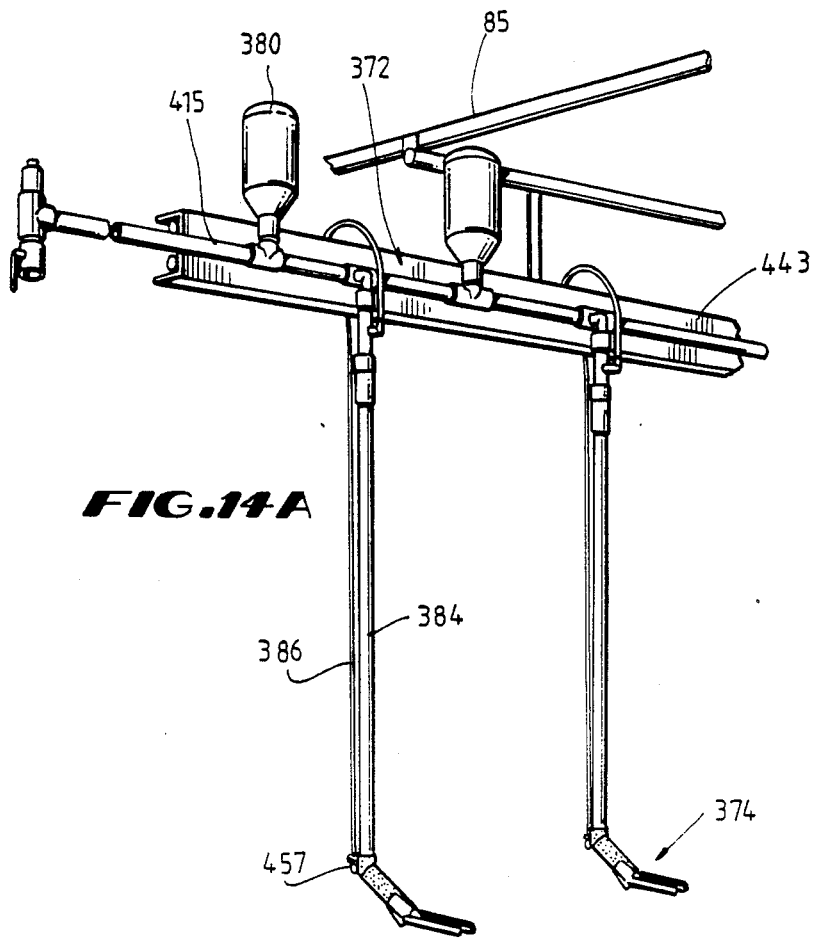
FIG. 14A is an orthographic view of a portion of the planter unit manifold with a pair of associated seed drop tubes and accumulators.

FIG. 14A provides an orthographic view of one end of a seed distribution manifold 372 supported from the span section 85 of a span and tower irrigation system. Illustrated are two sets of the seed drop tubes 384 with their associated accumulators 380 connected to the manifold pipe 415 and the associated trencher supply tubes 386. The manifold pipe 415 connects to the channel support member 443 which also supports the pressurized air 99 and water 102 supply lines (not illustrated). Each trencher supply hose 386 is secured parallel to its drop hose and terminates in a solid stream nozzle 457.

Figure 14B:
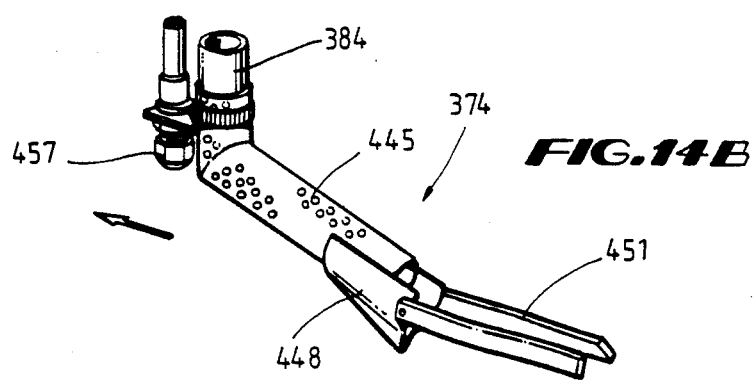
FIG. 14B is an orthographic view of a planting unit of the present invention.

FIG. 14B provides an orthographic view of the planter unit 374 which connects to the lower end of the drop tube 384. The perforated tube 445 couples to the drop tube 384 together with the solid stream nozzle 457. The shoe 448 connects to the open end of the tube 445, and a trench closer 451 angles toward the furrow to push dirt over the seed as the irrigation system advances through the field.

Figure 24:
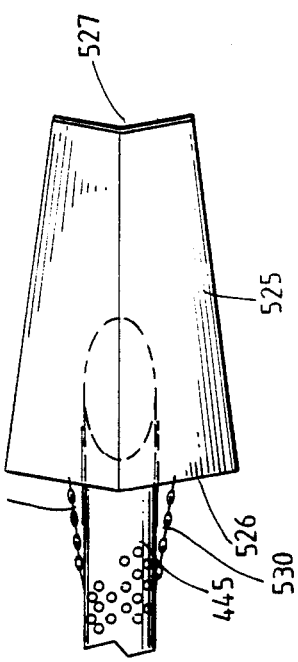
FIG. 24 is a top view of the alternate embodiment of the planter shoe illustrated in FIG. 23.
Figure 23:
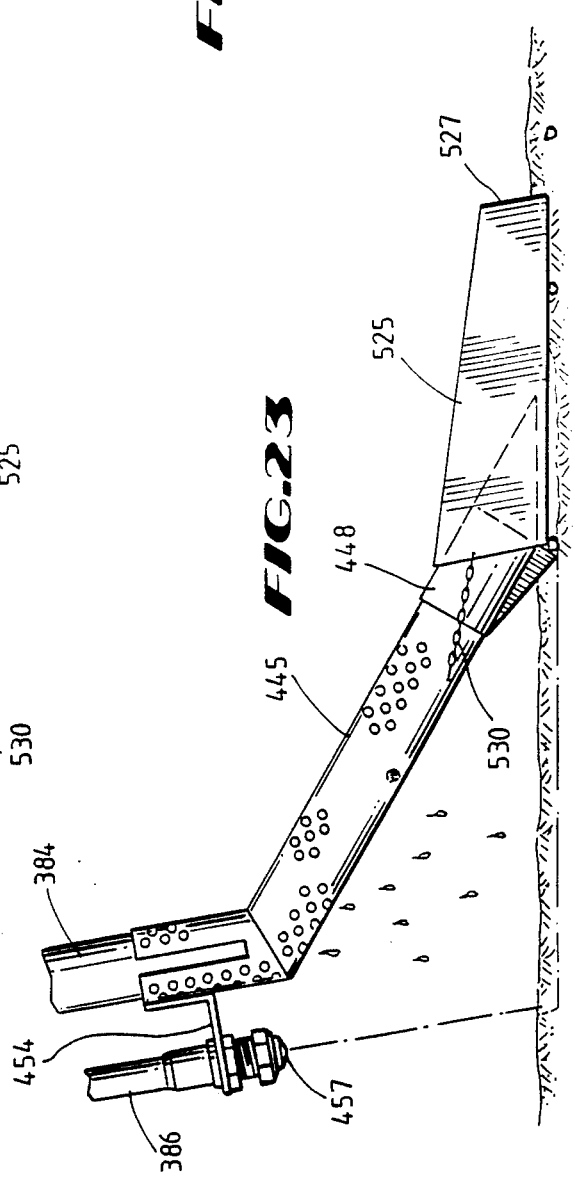
FIG. 23 is a side view of an alternate embodiment of the planter unit which connects at the lower end of a drop tube illustrated in FIG. 13.

FIG. 23 is a side view of an alternate embodiment of the planter unit 374 which connects at the lower end of the drop tube 384 of the present invention. The perforated metal screen 445 extends through the planting shoe 448 to define a downward-facing opening parallel to the soil surface. As illustrated in FIG. 24, the opening adjacent to the soil surface is oval in shape. A furrow closer 525 defines an inverted V-shape closer in cross section having a wider opening transverse to the direction of travel of the planter at the leading edge 526, than at the exit 527. In this embodiment, the trench closer 525 is secured to the perforated metal tube 455 by a chain 530. A furrow firmer 448 is disposed at the lower end of the tube 445.

FIG. 26 is a detailed side view of an alternate planter unit 533 for use preferably with the drop tube illustrated in FIG. 25. Secured to the lower end of the drop tube 384 is a knife blade 536 with an edge that extends into the soil. A sled 539 is secured by a chain 541 to the lower end of the drop tube 384. FIG. 27 provides a top view of this alternate embodiment for a planting shoe.

Still another alternate planting unit 543 is illustrated in FIG. 28. This alternate planting unit 543 preferably is disposed at the lower end of the alternate drop tube configuration illustrated in FIG. 25. An inverted V-shape trench closer 546 is pivotally connected to the lower end of the drop tube 384 at a pivot 549. The trench closer 546 as illustrated in FIG. 29 is wider at the opening end 551 than it is at the exit 553. The narrowing exit 553 of the trench closer 546 permits dislodged soil to be pushed over the opened furrow to cover planted seed.

Figure 16:
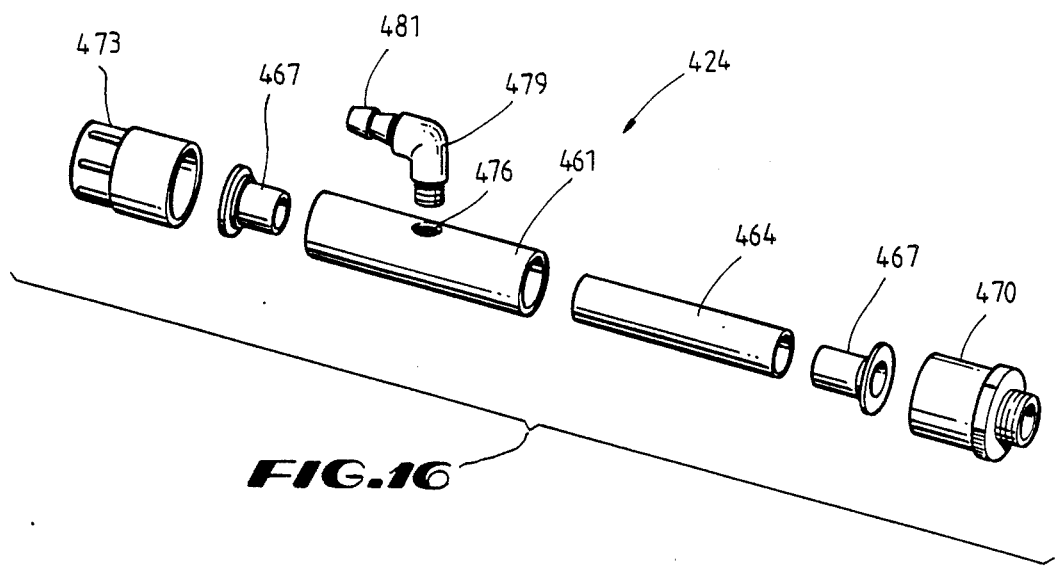
FIG. 16 is a detailed, exploded illustration of a tube valve for controlling discharge of seed and water through the planter drop tubes.

FIG. 16 is an exploded view of the tube valve 424 of the present invention. The tube valve 424 includes a rigid exterior tube 461 and a flexible interior tube 464 which has an outer diameter about equal to the inner diameter of the exterior tube 461. A pair of flat seat hose barbs 467 insert into the distal ends of the flexible tube 464. Appropriate slip couplers connect to the rigid tube 461: a male adaptor slip coupler 470 connects at one end and a female slip coupler 473 connects at the other end. A threaded aperture 476 in the side wall of the rigid tube 461 receives an elbow 479. The end of the elbow 479 has a hose barb adapted to receive an air supply tube.

The planter shoe of the present invention is illustrated in a front view in FIG. 17 and in a side view in FIG. 18. The shoe 448 defines a U-shaped plow which connects between the metal screen tube 445 and the trench closers 451. The planter shoe 448 may be assembled from a sheet of 18 gauge galvanized steel folded to define a lower v-shaped protrusion 491. In a preferred embodiment, the lower protrusion is about ⅝ inch long and about ⅜ inch wide at its upper end. The side walls of the upper portion 494 are about 1¼ inches apart at their widest point. The planter shoe itself is approximately 2 inches high. As illustrated in FIG. 18, an aperture is drilled in both side walls of the upper portion 494. In a preferred embodiment, the aperture 497 has a center where two lines intersect. These lines are parallel to the edges of the planter shoe and are inset about a quarter of an inch from the edge. In a preferred, specific embodiment, the hole is about 3/16 inch in diameter.

An angled trench closer 451 is illustrated in a side view in FIG. 19. The front end of the end trench closer 451 has an aperture 500. As illustrated in FIG. 20, the front end of the closer 451 has a beveled edge 503. Also, the trench closer 451 angles about 45 degrees around its longitudinal axis. This twist occurs approximately in the middle one-third section 506 of the trench closer 451. The trench closer is angled to direct dislodged moist soil over the furrow Turning now to FIG. 21, a bolt 509 inserts through the apertures 500 of the trench closer 451 and through the apertures 497 of the planter shoe. A nut 512 engages the threaded end of the bolt 509 to secure the pair of trench closers 451 to the side walls of the planter shoe 448.

Apparatus of the present invention may be used with a variety of seed for planting in a field. The field generally does not have to be plowed before planting; the invention may readily be used in no-till or low-till applications. Types of crop seed which may be planted using this apparatus range from small wheat seeds to the larger corn kernels. It is not necessary that the seed be pregerminated; however, it has been found that pregerminating the seed or priming the seed provides the seed a head start when the seed is placed into a furrow in the field. A primed seed is one which is exposed to large volumes of water so that the seed may absorb the water before the seed is placed in the field. A primed seed will germinate, or sprout a radical, more quickly than a non-primed seed. Accordingly, the present invention provides a facility to prime or pregerminate seeds for planting.

The combination germinator and seed/gel mixing tank 30 illustrated in FIG. 3 is first used to prime or pregerminate the crop seed. Valves 211, 215, 218 and 219 are closed. The cap 150 is removed and seed is introduced into the mixing tank 30. The seed in the tank 30 may then be germinated or primed. One method is to submerge the seed in water and slowly stir the water and seed with the mixing paddles. The water pump 222 is started and is used to transfer water from the germination water supply tank 207. The motor control 228 is switched on and the paddle drive motor 186 operates. The drive motor 186 turns the drive gear 189 which is connected by a chain 192 to the shaft drive gear 195. The hollow shaft 153 slowly turns, and the mixing paddles 169, 175 and 178 slowly stir the water and seed. The water and seed mix may also be aerated. A preferred embodiment of the present invention uses the air compressor 31 to force air or oxygen into the tank 30. The air enters the hollow shaft 156 through the inlet 196. The air moves through the apertures 166 to the aeration vents 172 attached to the bottom mixing paddle 169. Aeration further promotes mixing of the seed and the water and promotes the priming or germinating process.

A second method of germinating the seed consists of spraying the seed periodically with water from the spray nozzles 181. The periodic spraying maintains a moist environment in which the seed germinates. Again, the valves 215, 218 and 219 are closed, but the valve 211 may be left open to drain water from the tank 30 through the return pipe 209 into the germination water supply tank 207. An intermittent spray control in the control box 228 activates the water pump 222 at predetermined intervals for a selected amount of time. Water is pumped from the germination water supply tank 207 and communicated through the pipe 225 to the inlet pipe 183. The pipe 183 connects to the spray nozzles 181 which are supported by the dome 147 of the tank 30. The spray nozzles 181 are positioned in the upper portion of the tank 30 over the seed to be germinated. As with the previous method, the drive motor 186 may be operated at low revolutions per minute to turn slowly the hollow shaft 153 and thus turn the mixing paddles 169, 175, and 178 slowly through the moist seeds. Air or oxygen may be supplied through the hollow shaft 153 between the spray cycles using the air compressor 31. A preferred embodiment has two spray nozzles 181; however, additional spray nozzles may be used in larger tanks as well. The supply of water for the germinator may include an appropriate fungicide or other chemicals to aid germination and/or prevent seed degradation to prevent the growth of fungus while the seeds are germinating in the moist dark environment. Air or oxygen may be introduced to the tank 30 through the inlet 196 of the hollow shaft 153. The water spray cycle, the oxygen or aeration cycle, and the paddle speed are all regulated from a control box 228 at the germination facility 10.

Priming or pregerminating seed generally takes between about 10 and about 24 hours but may vary with seed type and degree of germination desired. After the seed are primed, the valve 211 is opened to drain the water from the tank 30 through the return pipe 209 into the germination water supply tank 207 or through another valve (not shown) to a waste drain. The seed is then mixed with a gel to uniformly suspend the seed in the gel.

The present invention uses a gel solution to suspend and uniformly distribute the seed. It is preferred that the seed be so suspended in a gel solution to provide uniform distribution of the seed into the carrier water and thus assure that the seed is substantially uniformly planted in the field. FIG. 2 illustrates the gel mixing tank 17 of the facility 10 which is normally separate from the tower and span planter 14 and the seed/gel injector trailer 12. A supply of a dry acrylamide copolymer potassium acrylate gel, such as Terra-sorb GB available from Industrial Services International in Bradenton, Fla. is added to the tank 17 through an inlet 19. The inlet 19 is closed and an appropriate amount of water is added to the dry gel through the water inlet 21 to give the desired volume of gel with an adequate specific gravity for seed suspension. The high pressure roller pump 27 starts and pumps the mixture through the recirculation pipe 125 to the jet agitators or mixing nozzles 127. These jet agitators 127 are positioned inside the tank 17 to cause a vigorous circulating motion in the tank.

After the gel is prepared, the valve 128 on the discharge side of the pump 27 is closed, and the valve 129 opened. The pump 27 is operated to direct the mixed gel from the tank 17 to the seed and gel mixing tank 30 through the pipe 131.

A preferred embodiment of the gel mixing tank 17 is cylindrical and has a capacity of about 200 gallons. The gel mixing tank 17 may be cleaned by opening valves 123, 128 and 129. Water entering the gel mixing tank 17 through the inlet 21 circulates through the pump 27 and the recirculation pipe 125. This cleans the nozzles 127 and the interior of the tank. The cleaning water used to rinse the inside of the tank exits the tank 17 through the drain pipe 121 or out of the pipe 131, which for cleaning, is not connected to the tank 30.

Turning again to FIG. 3, after the seeds are primed or pregerminated as discussed above, the water is drained from the tank 30 through the valve 211 and the return pipe 209 to the germination water supply tank 207. The water from the tank 30 may alternatively be directed to a waste drain. The screen butterfly valve 202 keeps seed in the tank 30 but permits the water to drain. The valve 211 is closed and the valves 215 and 218 are opened. Gel from the gel mixing tank 17 is pumped by the pump 27 through the pipe 131 into the bottom of the mixing tank 30. The valves 215 and 218 are closed. The drive motor 186 again operates, and the gel is mixed with the seed by the slowly turning mixing paddles 169, 175 and 178.

After the seed is uniformly distributed into the gel solution, the seed/gel mixture is transferred to the seed and gel holding tank 64 on the injection trailer 12 (see FIGS. 1 and 4). The removable cap 150 (FIG. 3) is secured to the dome 147 of the tank 30 to provide a tight seal. The valves 215 and 219 are opened. The tank 30 is pressurized with compressed air from the air compressor 31 located at the germination facility The air compressor 76 (see FIGS. 1 and 4) mounted on the seed injection unit may be used to supplement the supply of compressed air to pressurize the germinator tank 30. The compressed air enters the germinator tank 30 through the hollow shaft 153. Pressurizing the tank 30 forces the seed and gel mixture out the bottom of the tank 30 through the pipe 217 into the seed and gel tank 64 on the trailer 12.

Once the suspended seed and gel solution is placed in the seed and gel tank 64 of the seed transport and injection trailer 12, the trailer 12 may be connected to the control platform 82 of the mobile tower and span apparatus 14 and planting begins. The seed/gel mixture is injected into a pipe carrying a stream of water under pressure, distributed to seeding manifolds suspended from elevated spans, and passed through drop tubes for planting in the field.

The injection pump 67 of the present invention is better illustrated in FIGS. 5, 5A, 6 and 7. As described earlier, the pump 67 has dual cylinders 271 and 273 which operate as large opposing syringes. As explained previously, the dual cylinders in the pump 67 have identical components, and a suffix "a" is used to identify components associated with the cylinder 271. While one piston 276 is moving upwards, the other piston **276*a* is moving downward. The upward movement causes a vacuum in the cylinder 273, which sucks or pulls the seed/gel mixture from the storage tank 64; the downward movement forces the seed/gel mixture from the cylinder 271** into the pressurized water transport system.

The cylinders 271 and 273 stand vertically and are perpendicular to the pipe and valve arrangement 321 illustrated in FIG. 7. The ports 309 of the cylinders 271 and 273 connect to the apertures 327 in the branch tubes 324. The seed/gel inlet port 323 connects the parallel branches 324 to the seed/gel supply tank 64. The seed/-gel input control valves 328 in each branch 324 between the aperture 327 and the inlet port 323 are oppositely controlled, i.e., ball valve 328 is open when ball valve **328*a* is closed. The seed/gel outlet valves 329 in each branch 324 between the aperture 327 and the seed/gel outlet port 326 also are oppositely controlled, i.e., when ball valve 329 is open, ball valve 329*a* is closed. Note that the input ball valve 328 has an open or closed status opposite to that of its companion ball valve 328*a* and opposite to that of its associated outlet ball valve 329**.

The ball valves 328 and 329 are operated by double acting air cylinders 330. The piston arm 332 of the air cylinder 330 couples to the arm 331 of the ball valves. A four-way solenoid activated air valve 333 controls the opening and closing of the inlet valves 328 and the outlet valves 329. FIG. 7 further illustrates with dashed lines a schematic of the air control hoses coupled to the air cylinders 330.

FIG. 6 is a top view of the dual cylinder/seed gel injector pump 67. The variable speed DC motor 313 mounts to the upper frame 292 and operates to turn a sprocket 315. The drive chain 316 engages the teeth of the sprocket 311 which is rigidly mounted to the shaft 296. The pinion gears 299 mount approximately halfway between the sprocket 311 and the ends of the shaft 296. The pinion gear 299 engages the rack 279 which forms the piston shaft in the cylinder. The sprocket 311 driven by the motor 313 turns the shaft 296 to move one rack 279 either up or down while the other rack 279a moves in the opposite direction. Simultaneous movement in opposite directions arises because, as illustrated in FIG. 6, the rack 279 is on one side of the pinion 299 while the other rack 279a is on the opposite side of its associated pinion gear 299a.

A preferred, specific embodiment of the dual cylinder pump uses cylinders 271 and 273 made of acrylic tubing having about a four and one half inch outer diameter with a three eighths inch wall. The thirty inch tall cylinders are each secured between the upper and lower mounting plates by six circumferentially disposed tie-rods. These rods have a five sixteenth inch diameter and are threaded so that the mounting plates may be bolted to the tie rods. The drive motor 313 preferably uses direct current, and in the preferred, specific embodiment, is about one eighth horsepower. The motor drive gear 315 is a 40×12 tooth sprocket and the gear 311 is a 40×60 tooth sprocket. The pinion gear 299 is a 12-18 sprocket, and the rack has three-fourth inch, 12 point square teeth. The piston coupled to the rack is preferably machined delrin with opposing nylon seals. All of the air cylinders used in the valving network 321 have double acting pistons. A preferred specific embodiment uses a piston with a one and one half inch bore and a four inch stroke.

Figure 8B:
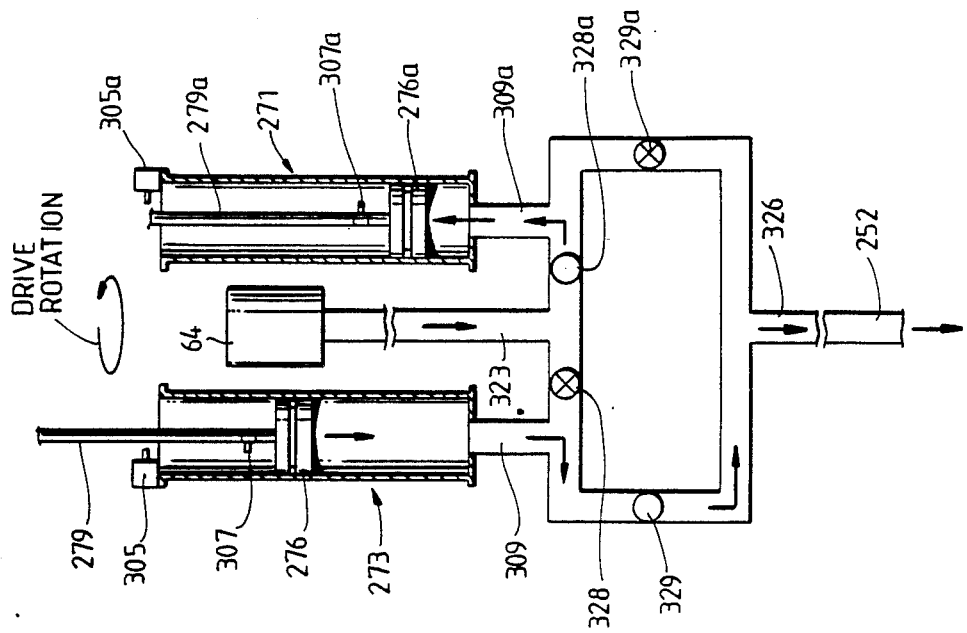
FIG. 8 is a schematic diagram of an injection pump depicting operation of the dual cylinder.
Figure 8A:
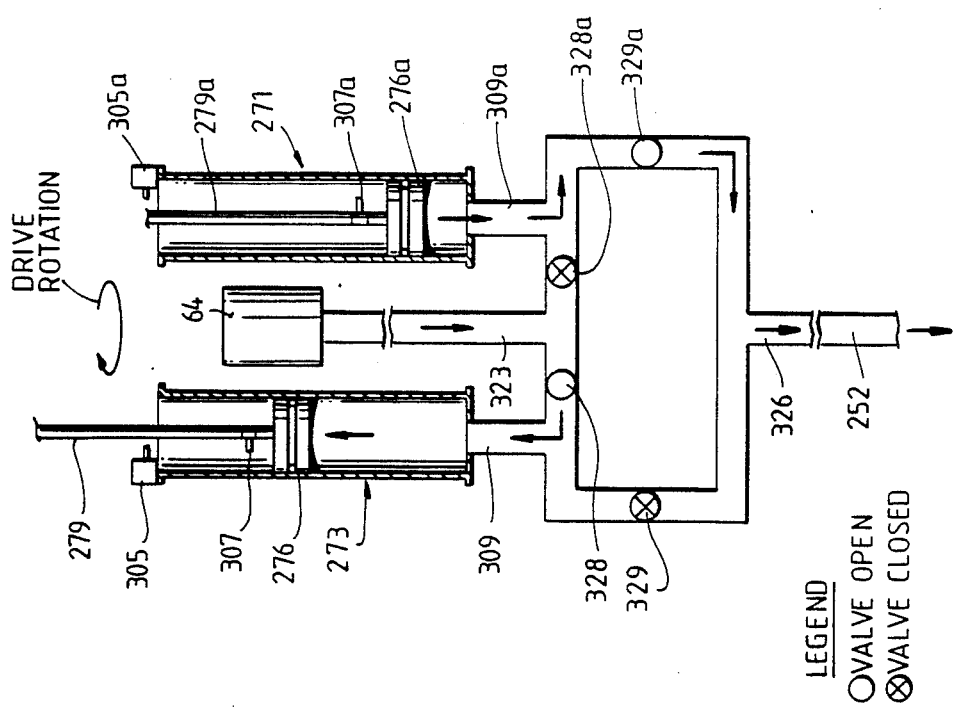

The operation of the dual cylinder injection pump 67 is more readily understood by reference to FIG. 8 which is a schematic of the injection pump 67 of the present invention. In cycle 1, the drive motor 313 is rotating clockwise. The rack 279 of the cylinder 273 is moving up while the rack 279a of the cylinder 271 is pushing the piston 276a downward. The inlet valve 328a is closed and the inlet valve 328 is open. The upward movement of the piston 276 in the cylinder 273 pulls seed and gel from the supply tank 64 through the inlet port 323, past the valve 328, through the port 309 and into the cylinder 273. At the same time, the companion cylinder 271 is injecting seed/gel into a stream of courier water. To do this, the output ball valve 329 is in a closed position and the output ball valve 329a for the cylinder 271 is in an open position. The piston 276a connected to the rack 279a is moving downward and pushes seed and gel from the cylinder 271 through the port 309a, past the ball valve 329a and through the outlet 326 and the pipe 252 into the pressurized seed and water line 105.

When the stop 307 touches the limit switch 305, the drive motor 313 stops and then reverses the direction of rotation to a clockwise direction. The four-way valve 333 operates to reverse the position of the input and output ball valves 328 and 329. Valve 328 closes while valve 328a opens. Also, valve 329 is opened and valve 329a is closed. The piston 276 begins moving downward pushed by the rack 279. The seed and gel from the cylinder 273 is pushed through the port 309, past the valve 329 and into the pressurized seed and water line 105 through the port 326 and the pipe 252. Simultaneously, seed and gel from the supply tank 64 is pulled through the inlet port 323 past the open valve 328, through the port 309a into the cylinder 271. The upward movement of the piston 276a continues until the limit stop 307a engages the stop switch 305a.

This process of alternately filling and emptying the cylinders 271 and 273 of seed/gel continues while the planter unit 14 moves through the field. A preferred embodiment of the present invention with four inch diameter cylinders has an injection rate ranging from about 0.02 to about 1.2 gallons per minute.

After the seed and gel are injected into the carrier water, the water and seed is conveyed through the pipe 105 along the span sections between the elevated towers. The span sections support the control signal conduit 96, the pressurized air supply line 99, the water supply manifold 102 and the seed and water supply line 105 as illustrated in the FIG. 10 schematic. This schematic illustrates the control and fluid flow lines for a plurality of drop tube planters hanging from an elevated span section to the ground. A preferred embodiment of the present invention has two planter subsystems or manifolds for each span, and each planter subsystem has sixteen drop tube planters. A substantially higher number of drop tubes per manifold may result in significant pressure drops across the manifold and uniform seed distribution may suffer.

The distribution manifold 372 includes the manifold recharge pipe 377, the accumulators 380, and the distribution pipe 415 down to the tube valves 382. This portion of each subsystem may be isolated and separately pressurized since the tube valves 382 are generally closed as the planter 14 moves through the field. The tube valves 382 open for only a fraction of a second to discharge the water and seed from the manifold. The drop tubes 384 and the hydraulic planting unit 374 depending from the tube valve 382, however, forms an open conduit from the tube valve 382 to the ground. The seed and water traveling through the conduit 105 enter the manifold recharge connection 377. Since the tube valves 382 are closed, the water and seed travels from the recharge connection 377 into the distribution manifold 372. The water gathers in the accumulators 380 and the seed is distributed along the distribution pipe 415. Recharging a manifold typically takes from about less than one second to about five seconds or more, depending on the carrier water pressure. When the manifold 372 is recharged, the valve 388 between the recharge connection 377 and the conduit 105 closes to isolate the pressurized manifold 372. The tube valves 382 then open, and the water, under the pressure in the accumulators 380, discharges through the manifold 372 carrying the seed in the manifold pipe 415 into and through the tube valves 382, through the planter drop tubes 384 and to the hydraulic planter units 374. The hydraulic planter unit 374 opens the furrow, deposits the seed in the furrow and closes the furrow.

FIG. 11 provides a detailed illustration of the manifold recharge connector 377. A ball valve 388 opens and closes due to the action of the air actuated cylinder 397. When the ball valve 388 is open, seed and water from the conduit 105 enters the manifold recharge connector 377. In a preferred embodiment, the manifold connector 377 is about two feet long and vertically disposed from the span section. The water and seed travels down through the recharge tube 391. Offset perpendicular ledges 394 form a ladder internal to the recharge tube 391, and the ledges 394 provide a place for seed to settle so that it remains substantially evenly distributed. The turbulence of the water flow through the tube 391 also helps redistribute the seed along the ladder 394 in the tube 391. The ladder 394 prevents seed from accumulating at the bottom of the tube 391 and blocking the elbow 405.

The carrier water is pressurized by the pump 42 on the seed injection trailer 12 so the water and seed are pushed through the tube 391 and travel through the flexible hose 408 into the distribution manifold 372 which is illustrated in FIG. 12. The hose 408 connects to the elbow connector 411. The seed and water distribute themselves along the pipe 415, and the water also gathers in the accumulators 380. Since the seed and water which enters the manifold 372 from the conduit 105 is under pressure, the water in the manifold 372 pressurizes the air in the accumulators 380. The seed settles out of the water and distributes itself along the manifold pipe 415. As noted previously, the tube valve 424 is closed since the port 427 is receiving air under pressure from the pressurized air conduit 99. Pressurized air keeps the tube valve 424 closed and permits the manifold to be pressurized with water and seed. The preferred embodiment of the present invention for use in a field having furrows on 40 inch centers positions each accumulator 380 approximately 20 inches from its associated drop tube 384. Generally the accumulators are placed on the manifold pipe 415 about halfway between adjacent furrow centers, or thus halfway between the adjacent planting drop tubes 384. Each drop tube planter has an accumulator 380, a tube valve 382, a planter drop tube 384, a hydraulic planter unit 374, and a hydraulic trencher supply line 386 which leads to the nozzle for excavating a furrow.

The elements of the drop tube planter are shown in FIG. 13. A preferred embodiment of the apparatus includes the aluminum channel support member 443 which holds the air manifold tube 99 and the water manifold hose 102 on the span section. The seed distribution manifold 372 also mounts to the support member. A 90 degree elbow connector 421 angled downward connects the seed distribution manifold pipe 415 with the tube valve 424. A smaller elbow connector 427 attached to the tube valve communicates air from the pressurized supply of air 99 through tubing into the tube valve 424. The air under pressure keeps the tube valve 424 closed. When the tube valve 424 opens, water under pressure in the manifold 372 pushes the seed distributed along the manifold pipe 415 through the tube valve 424. Gravity further assists discharge from the manifold 372. The seed and water travel down the drop tube 384 to the planter unit 374 attached to the bottom of the drop tube 384.

Figure 15:
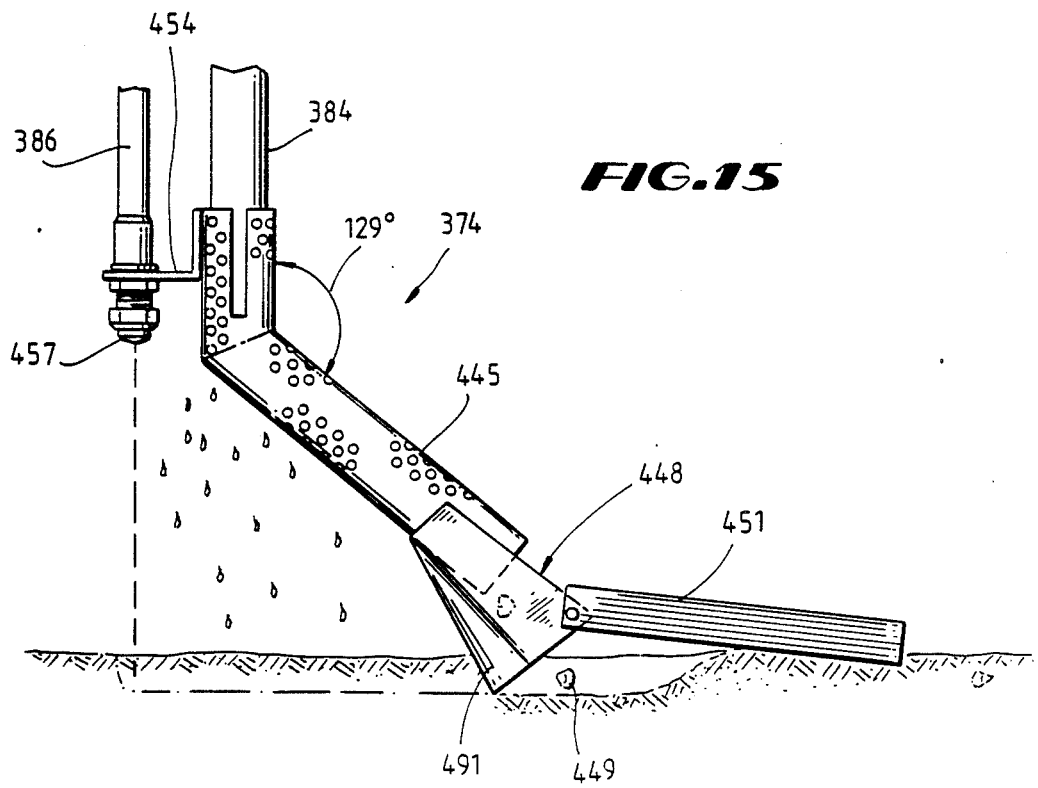
FIG. 15 is a detailed side view of a planter unit of the present invention.

With reference to FIG. 15, the water enters the perforated metal screen tube 445. The force of the water dissipates by discharging through the perforations in the tube 445. The seed 449 is carried in the tube 445 and deposited in a furrow cut by a high pressure stream of water from the trenching nozzle 457. A planter shoe 448 secured at the distal end of the tube 445 includes a protrusion 491 which widens and firms the trench cut by the nozzle 457. As the planter unit 14 continues to move through the field, the trench closers 451 bolted to the shoe 448 pass along the side of and over the furrow. One trench closer 451 is on each side of the furrow. The closers 451 are angled towards each other and push some of the dirt displaced from the furrow back over the furrow to cover the seed.

An alternate embodiment of the planter unit 374 is illustrated in FIG. 23. In this embodiment, the seed traveling through the drop tube 384 exits the perforated tube 445 through an oval opening on the lower side of the tube 445 parallel to the soil surface. The trench closer 525 of this alternate embodiment has in cross section an inverted V-shape. The trench closer 525 narrows towards the exit 527 to force dislodged soil from the sides of the furrow back over the furrow to cover the seed.

The accumulator system permits a pressurized discharge from the manifold while the manifold is closed to the main water/seed supply 105. The accumulator 380 is a small pressure tank and is available for each drop tube. During the recharging process with the tube valves 424 closed, the incoming water gathers in the accumulator 380, compressing the air and giving the desired pressure necessary to discharge the desired quantity of water and seed. The incoming seed remains in the manifold pipeline 415 and approximately the same number of seed should be located between each accumulator 380 and its respective discharge port 421 and valve 424. To discharge the manifold, the tube valves 424 on a manifold open in unison for a fraction of a second by a controller which momentarily vents the air pressure entering the tube valve 424 through the connector 427. Opening the tube valve 424 flushes the manifold in the direction from the accumulator 380 to the drop tube 384. The water flushes the manifold pipe 415 of seed in that section of pipe. It is preferred that only one seed be discharged per tube per cycle, but may not be possible for close seeded crops such as grain sorghum.

Apparatus of the present invention preferably uses a microprocessor controller for timing and sequencing of the various operations performed by the apparatus. The injection trailer 12 includes the electronic injection controller 70. This controller 70 controls the operation of the dual cylinder pump 67 and the injection of seed/gel into the pressurized water stream. The controller 70 also includes switches to activate and operate the air compressor 76 and the water pump 73. A microprocessor controller 91 is located on the control platform 82. The controller 91 provides overall sequencing and control of the seed distribution by the planter manifolds. As noted earlier, each span section in a preferred embodiment has two manifolds 85, and each manifold supports 16 drop tubes. Typical large mobile span and wheeled tower irrigation systems have many span sections, and combined can reach up to one-half a mile in total length. Such an irrigation device reaching one-half a mile may have about 16 to 20 spans.

The controller 91 communicates with a subsystem or a manifold control box 373 on each manifold 372. The subsystem control station 373 includes two solenoid activated valves: a four way spool valve which controls the recharge ball valve in the manifold connector and a three way pilot valve which controls the tube valves 424 in the drop tubes 384. The controller 91 opens the ball valve 388 to allow seed and water from the supply line 105 to charge the manifold 373 for a programmable period of time. The signal from the microprocessor 91 to the subsystem station activates a valve which controls the air cylinder 397. After the manifold is charged, the cylinder 397 operates and closes the ball valve 388. A programmed delay period then occurs. This provides an opportunity for the water and the seed to settle in the accumulators 380 and the pipe 415 of the manifold 372. The controller 91 then signals the pilot valve in the manifold subsystem controller 373 to vent the air pressure from the tube valves 424 in the manifold 372. Venting the pilot valve releases the air pressure traveling to the tube valves 424 through the ports 427. The collapsed latex tube in each tube valve 424 opens, and the water and seed discharges from the accumulator 380 and the pipe 415. The discharge occurs very quickly, and the microprocessor 91 then signals the pilot valve to stop venting, and reapply air pressure through the port 427 of the tube valves 424. This air pressure collapses the latex tube of each tube valve and seals the drop tubes 384 from the manifold 372. The charging and discharge periods may then occur again. The microprocessor 91 controls such charge and discharge operations at each manifold 372 along the line of spans and towers Turning now to FIG. 13, the flexibility of the planting apparatus of the present invention is illustrated. In a preferred embodiment, a short length of rubber hose 439 connects the pvc drop tube 384 with the tube valve 424. An aluminum channel support member 443 hanging from the span section 85 contains the air manifold tube 99 and the pressurized water manifold hose 102. The air manifold in a preferred, specific embodiment is ¼" tubing while the water manifold is a ½" hose. The tubing 386 which connects to the water manifold hose is a ⅜" polyethylene tube. Other similar flexible hoses could be used as well. The flexible connection of the drop tube 384 to the span section 85 provides flexibility necessary to plant on uneven terrain. The drop tube 384 may swing in an arc upwards of about 40 or more degrees from the vertical.

It is important that the seed distribution and planting process use an appropriate metering valve 424 for each drop tube 382. The valve 424 must be capable of fast actuation, be nondestructive to the seed, and be able to seal the bottom of the manifold 372 to permit pressurization of the manifold 372. FIG. 16 provides an exploded detailed view of the tube valve 424 of the present invention. The preferred embodiment uses a three quarter inch diameter PVC pipe around three and one-half inches long. The aperture 476 is drilled in the side wall of the pipe half way between the top and bottom of the length of pipe. The interior tubing 464 of the tube valve 424 in a preferred, specific embodiment is a one-half inch latex tube with a three thirty-second inch wall thickness. The tubing is about three and three-eighths inches long. This thin wall latex tubing is inserted into the PVC pipe which makes up the valve 424. Compressed air feeding into the valve 424 through the elbow 479 compresses the latex tubing to close the valve 424. The pressure of the compressed air for the valve 424 in a preferred embodiment is about 30 pounds per square inch. The air pressure injected into the tube valve 424 must be sufficient to collapse the interior latex tube and also to offset the pressure from the seed and water supply pipe 105 while the manifold is being recharged. In an alternate embodiment, electrically operated valves may replace the air actuated tube valves 424 of the present invention.

The planter unit 374 connects to the lower end of the drop tube 384. A preferred, specific embodiment of the present invention uses 14 gauge steel to make the perforated metal screen tube 445. One-eighth inch round holes are drilled with three-sixteenth inch staggered centers. The steel is then rolled to a one-inch inner diameter to form the tube 445. As illustrated in FIG. 15, the tube 445 makes an angle of about 130° with respect to the drop tube 384. The perforated metal screen angled from the vertical forms a chute to dissipate most of the water and absorb the kinetic energy of the water and seed falling through the drop tube 384. This allows the seed to flow smoothly through the tube 445 and the planter shoe 448 into the furrow. Without the angled perforated tube, seeds may be washed from the trench by the volume and velocity of the carrier water. It is contemplated that the perforated tube 445 could make an angle of between about 100 and about 160 degrees and still perform satisfactorily.

The planter shoe 448 illustrated in FIG. 15 attached to the distal end of the screen tube 445 has a protrusion 491 which widens and firms the trench or furrow cut by the trenching nozzle 457. The trenching nozzle forms a furrow by emitting a solid stream of water at pressures between about 15 and 40 psi. The pressure used depends on the desired depth of the furrow and the soil conditions at planting time.

FIG. 25 illustrates a more preferred embodiment of the drop tube 384 which depends from the manifold 372 of the present invention. In this embodiment, the perforated tube 445a is disposed at the upper end of the drop tube 384 adjacent to the flex hose 439. It is contemplated that positioning the perforated tube 445a between the tube valve and the lower end of the drop tube 384 will permit the water to dissipate its energy further away from the furrow and reduce the opportunity for the carrier water to wash the seed from the furrow. An alternate embodiment controls water flow through the perforated tube with a ring (not illustrated) which slides axially on the perforated tube 445a. It is contemplated that the ring may be positioned closer to the flex tube 439 to encourage more water to travel down the tube 384. Positioning the ring closer to the top of the tube 384 may permit more water to exit the tube 445a where it connects to the flex tube 439. Thus the planter may be adjusted to provide more water with seed which are not carried easily through the drop tube 384 to the planting units near the soil. Other seed may require a greater volume of carrier water. A preferred embodiment of the alternate embodiment illustrated in FIG. 25 has the perforated screen 445a connected to the lower end of the flex hose 439. However, an alternate embodiment may have the perforated tube 445 disposed between the flex hose 439 and the lower end of the drop tube 384.

The alternate embodiment of the drop tube 384 illustrated in FIG. 25 may use the alternate planter units 533 or 543 as illustrated in FIGS. 26 and 28. The alternate planter unit 533 illustrated in FIG. 26 drags a sled or plate 539 behind the drop tube 384. The sled 539 is secured to the lower end of the drop tube 384 by the chain 541. The knife blade 536 mounted to the leading side of the drop tube 384 opens the furrow. An edge of the knife 536 extends into the soil to cut a small trench or furrow as the system moves through the field. It is contemplated that this embodiment of a planter unit may not need the trenching nozzle 457 which communicates to a supply of water under pressure through a tube 386. Thus, using the blade 536 on the lower end of the drop tube 384 to open the furrow could possibly eliminate from the structure of the present invention the pressurized water supply manifold 102.

FIG. 28 illustrates a side view of an alternate embodiment of a planter unit for use with the drop tube illustrated in FIG. 25. This embodiment uses the trenching nozzle 457 mounted to the leading side of the drop tube 384 to cut the furrow. The trench closer 543 illustrated in top view in FIG. 29 has an inverted V-shape in cross section. The front end of the closer 546 connects at the pivot 549 to the lower end of the drop tube 384. The pivot 549 permits the trench closer 546 to move up and down in response to soil conditions. The trailing end 553 of the trench closer 546 is narrower transverse to the direction of travel of the planting unit than is the opening end 551. This permits the trench closer 546 to push dislodged soil back over the furrow to cover the seed.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention as described by the following claims.

What is claimed is:

1. A seed distribution manifold supported on a pipe span-and-tower irrigation system, comprising:
   a first horizontal disposed conduit manifold extending along and suspended from the span on the irrigation system;
   a second horizontally disposed conduit mounted on the span above the first conduit and adapted to convey a supply of seed in carrier water;
   a vertically disposed manifold recharge pipe connected at its lower end to the first conduit medial the conduit ends and connected at its upper end to the second conduit;
   a first valve in the manifold recharge pipe to regulate flow therethrough;
   at least one outlet pipe in fluid communication with and depending from the first conduit towards the ground;
   at least one accumulator in fluid communication with and extending upwardly from the first conduit; and
   a second valve disposed in each outlet pipe to control flow of seed and water through the outlet pipe.

2. The manifold of claim 6 further comprising a programmable controller operable to sequence the first and second valve operations to close each second valve before the first valve is opened and to open each second valve after the first valve is closed.

3. A seed distribution manifold as recited in claim 1, wherein the recharge pipe is internally configured to agitate the mixture of carrier water and seed to promote suspension of the seed in the carrier water.

4. A seed distribution manifold as recited in claim 1, wherein the recharge pipe is internally baffled.

* * * * *

UNITED STATES PATENT AND TRADEMARK OFFICE
CERTIFICATE OF CORRECTION

PATENT NO. : 4,949,656

DATED : August 21, 1990

INVENTOR(S) : Lyle, et al.

It is certified that error appears in the above-identified patent and that said Letters Patent is hereby corrected as shown below:

Col. 1, line 62, please insert --.-- between the words "practical" and "Pressure".

Col. 4, line 25, please insert --.-- between the words "water" and "Appropriate".

Col. 4, lines 36-37, please insert --.-- after the word "problems".

Col. 11, line 42, please insert --.-- between the words "connected" and "The".

Col. 11, line 68, please insert --.-- between the words "liters" and "A".

Col. 24, line 14, Claim 2, please delete [6] and insert --1--.

Signed and Sealed this

Sixth Day of October, 1992

Attest:

DOUGLAS B. COMER

Attesting Officer

Acting Commissioner of Patents and Trademarks